United States Patent
Hardy et al.

(10) Patent No.: US 9,619,545 B2
(45) Date of Patent: Apr. 11, 2017

(54) NAÏVE, CLIENT-SIDE SHARDING WITH ONLINE ADDITION OF SHARDS

(71) Applicant: Oracle International Corporation, Redwood Shores, CA (US)

(72) Inventors: Alexandre Hardy, Pinelands (ZA); Omkar Tilak, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 375 days.

(21) Appl. No.: 14/226,557

(22) Filed: Mar. 26, 2014

(65) Prior Publication Data

US 2015/0006482 A1   Jan. 1, 2015

Related U.S. Application Data

(60) Provisional application No. 61/841,045, filed on Jun. 28, 2013.

(51) Int. Cl.
*G06F 17/30* (2006.01)

(52) U.S. Cl.
CPC .. *G06F 17/30578* (2013.01); *G06F 17/30371* (2013.01); *G06F 17/30584* (2013.01)

(58) Field of Classification Search
CPC ......... G06F 17/30578; G06F 17/30371; G06F 17/30584
See application file for complete search history.

(56) References Cited

U.S. PATENT DOCUMENTS

| | | |
|---|---|---|
| 4,086,628 A | 4/1978 | Woodrum |
| 5,239,648 A | 8/1993 | Nukui |
| 5,463,774 A | 10/1995 | Jenness |
| 5,832,505 A | 11/1998 | Kasso et al. |
| 6,047,129 A | 4/2000 | Frye |

(Continued)

FOREIGN PATENT DOCUMENTS

| | | |
|---|---|---|
| CN | 101969475 | 2/2011 |
| CN | 104303175 | 1/2015 |

(Continued)

OTHER PUBLICATIONS

European Search Report for Application No. EP 13748986 dated Sep. 8, 2015, 7 pages.

(Continued)

*Primary Examiner* — Etienne Leroux
*Assistant Examiner* — Jared Bibbee
(74) *Attorney, Agent, or Firm* — Kilpatrick Townsend & Stockton LLP

(57) ABSTRACT

Multiple clients can be enabled to perform operations relative to data items in a shard system asynchronously to each other without the use by those clients of exclusive locks. A rebalancing event, in which data items are redistributed automatically among a set of shards due to a modification of the quantity of shards in the system, can be performed without the use of exclusive locks by clients. Clients can continue to perform operations relative to at least some of the data items in the shard system even while rebalancing processes are redistributing at least some of the data items asynchronously during a system-wide rebalancing event. All of these benefits can be obtained without sacrificing data consistency within the shard system.

20 Claims, 12 Drawing Sheets

(56) References Cited

U.S. PATENT DOCUMENTS

| | | | |
|---|---|---|---|
| 6,473,800 B1 | 10/2002 | Jerger et al. | |
| 6,772,350 B1 | 8/2004 | Belani et al. | |
| 6,944,777 B1 | 9/2005 | Belani et al. | |
| 7,200,865 B1 | 4/2007 | Roscoe et al. | |
| 7,225,210 B2 | 5/2007 | Guthrie, II | |
| 7,475,419 B1 | 1/2009 | Basu et al. | |
| 7,602,756 B2 | 10/2009 | Gu et al. | |
| 7,631,306 B1 | 12/2009 | Puig et al. | |
| 7,734,643 B1* | 6/2010 | Waterhouse | G06F 17/30067 707/770 |
| 7,886,038 B2 | 2/2011 | Ferris | |
| 7,890,626 B1 | 2/2011 | Gadir | |
| 7,921,452 B2 | 4/2011 | Ridion et al. | |
| 7,953,823 B2 | 5/2011 | Rider et al. | |
| 7,958,246 B2 | 6/2011 | Barber | |
| 8,037,108 B1 | 10/2011 | Chang | |
| 8,086,177 B2 | 12/2011 | Trift et al. | |
| 8,108,377 B2 | 1/2012 | Jiang et al. | |
| 8,201,175 B2 | 6/2012 | Zhu | |
| 8,209,415 B2 | 6/2012 | Wei | |
| 8,341,141 B2 | 12/2012 | Krislov | |
| 8,347,263 B1 | 1/2013 | Offer | |
| 8,438,654 B1 | 5/2013 | von Eicken et al. | |
| 8,464,250 B1 | 6/2013 | Ansel | |
| 8,468,455 B2 | 6/2013 | Jorgensen et al. | |
| 8,472,438 B2 | 6/2013 | Kini et al. | |
| 8,495,611 B2 | 7/2013 | McCarthy et al. | |
| 8,504,689 B2 | 8/2013 | Ferris et al. | |
| 8,509,231 B2 | 8/2013 | Hoole et al. | |
| 8,577,937 B1 | 11/2013 | Offer | |
| 8,584,215 B2 | 11/2013 | Narasimha et al. | |
| 8,850,528 B2 | 9/2014 | Van Biljon et al. | |
| 8,938,540 B2 | 1/2015 | Van Biljon et al. | |
| 8,977,679 B2 | 3/2015 | Van Biljon et al. | |
| 9,021,009 B2 | 4/2015 | Van Biljon et al. | |
| 9,032,069 B2 | 5/2015 | Van Biljon et al. | |
| 9,076,168 B2 | 7/2015 | Van Biljon et al. | |
| 9,087,352 B2 | 7/2015 | Van Biljon et al. | |
| 9,171,323 B2 | 10/2015 | Van Biljon et al. | |
| 9,202,239 B2 | 12/2015 | Van Biljon et al. | |
| 9,218,616 B2 | 12/2015 | Van Biljon et al. | |
| 9,232,000 B1* | 1/2016 | Pittman | H04L 67/1002 |
| 2002/0052941 A1 | 5/2002 | Patterson | |
| 2002/0097747 A1 | 7/2002 | Kirkby et al. | |
| 2003/0018927 A1 | 1/2003 | Gadir et al. | |
| 2003/0037284 A1 | 2/2003 | Srinivasan et al. | |
| 2003/0105810 A1 | 6/2003 | McCrory et al. | |
| 2003/0229623 A1 | 12/2003 | Chang et al. | |
| 2004/0024892 A1 | 2/2004 | Creswell et al. | |
| 2004/0184070 A1 | 9/2004 | Kiraly et al. | |
| 2004/0250120 A1 | 12/2004 | Ng | |
| 2005/0038834 A1 | 2/2005 | Souder et al. | |
| 2005/0055306 A1 | 3/2005 | Miller et al. | |
| 2005/0065855 A1 | 3/2005 | Geller | |
| 2005/0187937 A1 | 8/2005 | Kawabe et al. | |
| 2005/0193218 A1 | 9/2005 | Susser et al. | |
| 2006/0112176 A1 | 5/2006 | Liu et al. | |
| 2006/0209868 A1 | 9/2006 | Callaghan | |
| 2006/0212545 A1 | 9/2006 | Nichols et al. | |
| 2006/0259947 A1 | 11/2006 | Aarnos et al. | |
| 2007/0072591 A1 | 3/2007 | McGary et al. | |
| 2007/0162456 A1 | 7/2007 | Agassi et al. | |
| 2007/0234332 A1 | 10/2007 | Brundridge et al. | |
| 2007/0255798 A1 | 11/2007 | Schneider | |
| 2008/0052203 A1 | 2/2008 | Beyer et al. | |
| 2008/0195760 A1 | 8/2008 | Nudler | |
| 2008/0228734 A1 | 9/2008 | Kang | |
| 2008/0316980 A1 | 12/2008 | Ahlen et al. | |
| 2009/0024522 A1 | 1/2009 | Reunert et al. | |
| 2009/0182622 A1 | 7/2009 | Agarwal et al. | |
| 2009/0210429 A1* | 8/2009 | Agrawal | G06F 17/30578 |
| 2009/0235342 A1 | 9/2009 | Manion et al. | |
| 2009/0240728 A1 | 9/2009 | Shukla et al. | |
| 2009/0276771 A1 | 11/2009 | Nickolov et al. | |
| 2009/0300210 A1 | 12/2009 | Ferris | |
| 2009/0300350 A1 | 12/2009 | Gai et al. | |
| 2009/0319529 A1 | 12/2009 | Bartlett et al. | |
| 2009/0327471 A1 | 12/2009 | Astete et al. | |
| 2010/0036736 A1 | 2/2010 | McGee et al. | |
| 2010/0042720 A1 | 2/2010 | Stienhans et al. | |
| 2010/0061391 A1 | 3/2010 | Sindhu et al. | |
| 2010/0070501 A1 | 3/2010 | Walsh et al. | |
| 2010/0071035 A1 | 3/2010 | Budko et al. | |
| 2010/0083004 A1 | 4/2010 | Kirshenbaum | |
| 2010/0114714 A1 | 5/2010 | Vitek | |
| 2010/0169477 A1 | 7/2010 | Stienhans et al. | |
| 2010/0180014 A1 | 7/2010 | Kannan et al. | |
| 2010/0185455 A1 | 7/2010 | Miller | |
| 2010/0194963 A1 | 8/2010 | Terashima | |
| 2010/0197267 A1 | 8/2010 | Raleigh | |
| 2010/0198972 A1 | 8/2010 | Umbehocker | |
| 2010/0217840 A1 | 8/2010 | Dehaan et al. | |
| 2010/0223385 A1 | 9/2010 | Gulley et al. | |
| 2010/0250748 A1 | 9/2010 | Sivasubramanian et al. | |
| 2010/0250956 A1 | 9/2010 | Reed et al. | |
| 2010/0251242 A1 | 9/2010 | Sivasubramanian et al. | |
| 2010/0269109 A1 | 10/2010 | Cartales | |
| 2010/0274769 A1* | 10/2010 | Hazlewood | G06F 17/30067 707/679 |
| 2010/0275059 A1* | 10/2010 | Hazlewood | H04L 29/12132 714/15 |
| 2010/0318645 A1 | 12/2010 | Hoole et al. | |
| 2010/0332629 A1 | 12/2010 | Cotugno et al. | |
| 2011/0016214 A1 | 1/2011 | Jackson | |
| 2011/0022652 A1 | 1/2011 | Lai et al. | |
| 2011/0022812 A1 | 1/2011 | van der Linden et al. | |
| 2011/0055034 A1 | 3/2011 | Ferris et al. | |
| 2011/0055378 A1 | 3/2011 | Ferris et al. | |
| 2011/0055712 A1 | 3/2011 | Tung et al. | |
| 2011/0078679 A1 | 3/2011 | Bozek et al. | |
| 2011/0096174 A1 | 4/2011 | King et al. | |
| 2011/0099146 A1 | 4/2011 | McAlister et al. | |
| 2011/0106875 A1 | 5/2011 | Koenig | |
| 2011/0119381 A1 | 5/2011 | Glover et al. | |
| 2011/0126047 A1 | 5/2011 | Anderson et al. | |
| 2011/0126168 A1 | 5/2011 | Ilyayev | |
| 2011/0126197 A1 | 5/2011 | Larsen et al. | |
| 2011/0185063 A1 | 7/2011 | Head et al. | |
| 2011/0191610 A1 | 8/2011 | Agarwal et al. | |
| 2011/0209064 A1 | 8/2011 | Jorgensen et al. | |
| 2011/0213687 A1 | 9/2011 | Ferris et al. | |
| 2011/0214124 A1 | 9/2011 | Ferris et al. | |
| 2011/0225299 A1 | 9/2011 | Nathuji et al. | |
| 2011/0225467 A1 | 9/2011 | Betzler et al. | |
| 2011/0231525 A1 | 9/2011 | Balani et al. | |
| 2011/0243553 A1 | 10/2011 | Russell | |
| 2011/0246253 A1 | 10/2011 | Yu et al. | |
| 2011/0246984 A1 | 10/2011 | Sharp et al. | |
| 2011/0258692 A1 | 10/2011 | Morrison et al. | |
| 2011/0265081 A1 | 10/2011 | Lucovsky et al. | |
| 2011/0265147 A1 | 10/2011 | Liu | |
| 2011/0265164 A1 | 10/2011 | Lucovsky et al. | |
| 2011/0270721 A1 | 11/2011 | Kusterer | |
| 2011/0270968 A1 | 11/2011 | Salsburg et al. | |
| 2011/0282832 A1* | 11/2011 | Rishel | G06F 9/5083 707/609 |
| 2011/0282940 A1 | 11/2011 | Zhang et al. | |
| 2011/0295999 A1 | 12/2011 | Ferris et al. | |
| 2011/0296019 A1 | 12/2011 | Ferris et al. | |
| 2011/0307899 A1 | 12/2011 | Lee et al. | |
| 2012/0017112 A1 | 1/2012 | Broda et al. | |
| 2012/0030672 A1 | 2/2012 | Zygmuntowicz et al. | |
| 2012/0047239 A1 | 2/2012 | Donahue et al. | |
| 2012/0072985 A1 | 3/2012 | Davne et al. | |
| 2012/0078849 A1 | 3/2012 | Bryant et al. | |
| 2012/0079276 A1 | 3/2012 | Evans et al. | |
| 2012/0096158 A1 | 4/2012 | Astete et al. | |
| 2012/0110055 A1 | 5/2012 | Van Biljon et al. | |
| 2012/0110056 A1 | 5/2012 | Van Biljon et al. | |
| 2012/0110180 A1 | 5/2012 | Van Biljon et al. | |
| 2012/0110188 A1 | 5/2012 | Van Biljon et al. | |
| 2012/0110636 A1 | 5/2012 | Van Biljon et al. | |
| 2012/0110650 A1 | 5/2012 | Van Biljon et al. | |
| 2012/0110651 A1 | 5/2012 | Van Biljon et al. | |

(56) References Cited

U.S. PATENT DOCUMENTS

| | | | |
|---|---|---|---|
| 2012/0116937 A1 | 5/2012 | Van Biljon et al. | |
| 2012/0117229 A1 | 5/2012 | Van Biljon et al. | |
| 2012/0124211 A1 | 5/2012 | Kampas et al. | |
| 2012/0150791 A1* | 6/2012 | Willson | G06F 17/30563 707/600 |
| 2012/0185913 A1 | 7/2012 | Martinez et al. | |
| 2012/0221603 A1 | 8/2012 | Kothule et al. | |
| 2012/0246646 A1 | 9/2012 | Bakman | |
| 2012/0259815 A1 | 10/2012 | Olson | |
| 2012/0310880 A1 | 12/2012 | Giampaolo et al. | |
| 2012/0310991 A1* | 12/2012 | Frantz | G06F 17/30306 707/799 |
| 2013/0030853 A1 | 1/2013 | Agarwal et al. | |
| 2013/0036213 A1 | 2/2013 | Hasan et al. | |
| 2013/0060839 A1 | 3/2013 | Van Biljon et al. | |
| 2013/0125217 A1 | 5/2013 | Edwards et al. | |
| 2013/0173798 A1 | 7/2013 | Micucci et al. | |
| 2015/0120936 A1 | 4/2015 | Palan et al. | |
| 2015/0264121 A1 | 9/2015 | Van Biljon et al. | |
| 2016/0197843 A1 | 7/2016 | Palan et al. | |

FOREIGN PATENT DOCUMENTS

| | | |
|---|---|---|
| CN | 104335179 | 2/2015 |
| CN | 105339940 A | 2/2016 |
| EP | 2583211 | 4/2013 |
| EP | 2812809 | 12/2014 |
| EP | 2815346 | 12/2014 |
| EP | 3014485 | 5/2016 |
| JP | 2015507301 | 3/2015 |
| JP | 2015512091 | 4/2015 |
| WO | 2009151729 | 12/2009 |
| WO | WO2011159842 A2 | 12/2011 |
| WO | 2011159842 | 3/2012 |
| WO | WO2012/167108 A1 | 12/2012 |
| WO | 2013119841 | 8/2013 |
| WO | 2013122815 | 8/2013 |
| WO | 2014209848 | 12/2014 |

OTHER PUBLICATIONS

International Preliminary Report on Patentability for application PCT/US2013/025211 (Aug. 19, 2014), 9 pages.
International Preliminary Report on Patentability for application PCT/US2014/043599, mailed Jan. 7, 2016, 8 pages.
International Search Report and Written Opinion for application PCT/US2014/043599, mailed Oct. 14, 2014, 11 pages.
International Search Report for application PCT/US2013/025186 (Apr. 19, 2013), 2 pages.
International Search Report for application PCT/US2013/025211 (Apr. 16, 2013), 2 pages.
International Search Report and Written Opinion from PCT/US11/40590 mailed Jan. 5, 2012, 8 pages.
U.S. Appl. No. 13/299,066, Notice of Allowance mailed Jul. 31, 2015, 23 pages.
U.S. Appl. No. 13/299,157 Non-Final Office Action mailed on Dec. 3, 2014, 10 pages.
U.S. Appl. No. 13/299,157, Notice of Allowance mailed on Feb. 27, 2015, 9 pages.
U.S. Appl. No. 13/299,206 Notice of Allowance mailed on Dec. 19, 2014, 10 pages.
U.S. Appl. No. 13/299,206, Non-Final Office Action mailed on May 22, 2014, 10 pages.
U.S. Appl. No. 13/299,262, Non-Final Office Action mailed on Nov. 17, 2014, 14 pages.
U.S. Appl. No. 13/299,262, Notice of Allowance mailed on Mar. 3, 2015, 10 pages.
U.S. Appl. No. 13/299,287, Corrected Notice of Allowance mailed on Oct. 15, 2014, 2 pages.
U.S. Appl. No. 13/299,287, Final Office Action mailed on May 23, 2014, 12 pages.
U.S. Appl. No. 13/299,287, Notice of Allowance mailed on Sep. 16, 2014, 16 pages.
U.S. Appl. No. 13/299,301, Final Office Action mailed On Jan. 29, 2015, 13 pages.
U.S. Appl. No. 13/299,301, Non-Final Office Action mailed on Jun. 12, 2014, 18 pages.
U.S. Appl. No. 13/299,301, Notice of Allowance mailed Jun. 12, 2015, 5 pages.
U.S. Appl. No. 13/299,319 Notice of Allowance mailed on Jan. 13, 2015, 9 pages.
U.S. Appl. No. 13/299,319, Non-Final Office Action mailed on Jun. 6, 2014, 13 pages.
U.S. Appl. No. 13/299,335, Corrected Notice of Allowance mailed on Oct. 6, 2014, 4 pages.
U.S. Appl. No. 13/299,339, Non-Final Office Action mailed on Sep. 3, 2014, 8 pages.
U.S. Appl. No. 13/299,339, Notice of Allowance mailed on Apr. 21, 2015, 17 pages.
U.S. Appl. No. 14/459,104 3rd party Submission mailed on May 29, 2015, 14 pages.
U.S. Appl. No. 13/299,004, filed Nov. 17, 2011, Final Office Action mailed Oct. 2, 2013, 42 pages.
U.S. Appl. No. 13/299,004, filed Nov. 17, 2011, Non-Final Office Action mailed Apr. 15, 2013, 58 pages.
U.S. Appl. No. 13/299,004, Notice of Allowance mailed Mar. 24, 2014, 22 pages.
U.S. Appl. No. 13/299,066, filed Nov. 17, 2011, Final Office Action mailed Oct. 22, 2013, 25 pages.
U.S. Appl. No. 13/299,066, filed Nov. 17, 2011, Non-Final Office Action mailed Apr. 12, 2013, 26 pages.
U.S. Appl. No. 13/299,066, Final Office Action mailed Jul. 18, 2014, 19 pages.
U.S. Appl. No. 13/299,066, Non-Final Office Action mailed Mar. 12, 2014, 16 pages.
U.S. Appl. No. 13/299,066, Non-Final Office Action mailed Mar. 19, 2015, 17 pages.
U.S. Appl. No. 13/299,157, filed Nov. 17, 2011, Final Office Action mailed Dec. 5, 2013, 9 pages.
U.S. Appl. No. 13/299,157, filed Nov. 17, 2011, Non-Final Office Action mailed May 24, 2013, 14 pages.
U.S. Appl. No. 13/299,262, filed Nov. 17, 2011, Final Office Action mailed Oct. 30, 2013, 11 pages.
U.S. Appl. No. 13/299,262, filed Nov. 17, 2011, Non-Final Office Action mailed May 2, 2013, 12 pages.
U.S. Appl. No. 13/299,287, filed Nov. 17, 2011, Non-Final Office Action mailed Oct. 28, 2013, 18 pages.
U.S. Appl. No. 13/299,335, filed Nov. 17, 2011, Non-Final Office Action mailed Nov. 22, 2013, 24 pages.
U.S. Appl. No. 13/299,335, Notice of Allowance mailed Jul. 18, 2014, 7 pages.
U.S. Appl. No. 13/299,335, Notice of Allowance mailed May 1, 2014, 7 pages.
U.S. Appl. No. 13/299,335, Notice of Allowance mailed Sep. 15, 2014, 10 pages.
U.S. Appl. No. 13/299,339, filed Nov. 17, 2011, Advisory Action mailed Oct. 18, 2013, 2 pages.
U.S. Appl. No. 13/299,339, filed Nov. 17, 2011, Final Office Action mailed Aug. 7, 2013, 16 pages.
U.S. Appl. No. 13/299,339, filed Nov. 17, 2011, Non-Final Office Action mailed Nov. 16, 2012, 12 pages.
Baron Schwartz et al., "High Performance MySQL: Optimization, Backups, Replication, and More", Jun. 2008, pp. 428-429.
Canetti et al. "Practical delegation of computation using multiple servers," CCS '11 Proceedings of the 18th ACM conference on Computer and communications security, Oct. 2011, 10 pages.
Karjoth, Gunter, "Access Control with IBM Trivoli Access", May 2003, IBM Research, Zurich Research Laboratory, vol. 6, No. 2, pp. 232-257.
Liu et al., "NIST Cloud Computing Reference Architecture", NIST Special Publication 500-292, Sep. 8, 2011, 35 pages.
M-T Schmidt et al., "The Enterprise Service Bus: Making service-oriented acrrhitecture real", IBM Systems Journal, vol. 44, No. 4, Oct. 1, 2005, pp. 781-797.

(56) References Cited

OTHER PUBLICATIONS

International Application No. PCT/US2011/040590, International Preliminary Report on Patentability mailed on Jan. 3, 2013, 11 pages.
International Application No. PCT/US2013/025186, International Preliminary Report on Patentability mailed on Aug. 21, 2014, 6 pages.
U.S. Appl. No. 13/299,339, Notice of Allowance mailed on Jun. 27, 2014, 17 pages.
"A White Paper from the Open Cloud Standards", Interoperable Clouds, Version: 1.0.0, Nov. 11, 2009, pp. 1-21.
"Managing VMware VirtualCenter Roles and Permissions", Retrieved from the Internet: URL:http://www.vmware.com/pdf/vi3_vc_roles.pdf, Apr. 4, 2007, 15 pages.
"VMware Virtual Networking Concepts", Retrieved from the Internet: https://www.vmware.com/files/pdf/virtual_networking_concepts.pdf, Jul. 18, 2007, 12 pages.
Danwei et al., "Access Control of Cloud Service Based on UCON", Cloud Computing, Springer Berlin Heidelberg, Dec. 1, 2009, pp. 559-564.
EP11796398.3, "Extended European Search Report", May 25, 2016, 14 pages.
EP11796398.3, "Partial Supplementary European Search Report", Apr. 7, 2016, 6 pages.
EP13746545.6, "Extended European Search Report", Apr. 26, 2016, 8 pages.
Fitzpatrick, "Tonido Keeps Cloud Computing Local", Retrieved from the Internet: URL:http:f/lifehacker.com/5208833/tonido-keeps-cloud-computing-local, Apr. 13, 2009, 2 pages.
Thain et al., "Distributed Computing in Practice: The Condor Experience", Concurrency and Computation: Practice and Experience, vol. 17, Jan. 1, 2005, 37 pages.
U.S. Appl. No. 14/459,104, "Non-Final Office Action", May 20, 2016, 28 pages.
U.S. Appl. No. 14/724,043, "Non-Final Office Action", Jun. 16, 2016, 24 pages.
Chinese Application No. 201380014187.4, Office Action mailed on May 27, 2016, 14 pages (6 pages of Original document and 8 pages of English Translation).
U.S. Appl. No. 14/377,811, Non-Final Office Action mailed on Jul. 15, 2016, 17 pages.

* cited by examiner

NAÏVE, CLIENT-SIDE SHARDING WITH ONLINE ADDITION OF SHARDS

CROSS-REFERENCES TO RELATED APPLICATIONS; PRIORITY CLAIM

The present application claims priority under 35 U.S.C. §119 to U.S. Provisional Patent Application Ser. No. 61/841,045, titled NAÏVE, CLIENT-SIDE SHARDING WITH ONLINE ADDITION OF SHARDS, filed on Jun. 28, 2013, and the entire contents of which are incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In a system of database shards, data items, such as records or rows or documents, can be distributed among multiple separate, independent databases, called shards. In such a system, data items typically are not, and are not permitted to be, duplicated among the shards. Thus, in such a system, a particular data item will be located on only one of the several shards at any given time. In order for a client to determine which of the several shards contains the particular data item, the client can input the data item's primary key—which uniquely identifies the particular data item—into a hash function. The hash function computes, based on the primary key, the identity of the shard on which the particular data item is currently stored. For example, a hash function might divide a numeric primary key by the quantity of shards in the system and then take the remainder (essentially a modulo operation) to be the identifier for the shard that contains the particular data item. Using such a hash function to determine, in the first place, the shard on which each data item will be stored typically causes data items to be distributed relatively evenly among the shards.

Once the client has identified the shard upon which a particular data item is located, the client can perform operations, such as read, delete, or update operations, relative to the data item. Usually, a shard system will serve numerous clients concurrently, and these clients may each perform, asynchronously to each other, operations relative to separate data items. Potentially, multiple clients could inadvertently attempt to perform operations relative to the same data item simultaneously. If this scenario were permitted to occur unhindered, then the data item could become corrupted, making the state of the shard system inconsistent. Under one approach, in order to guarantee that multiple clients will not concurrently perform operations relative to the same data item, a client that seeks to perform an operation relative to a particular data item can first be required to acquire an exclusive lock on that particular data item. Each data item can be associated with a separate lock. A client is prevented from acquiring the exclusive lock on the particular data item if another client already holds that exclusive lock; under such circumstances, the client seeking to obtain the exclusive lock must wait for the lock-holding client to release the exclusive lock. While a client is holding the exclusive lock on a particular data item, that client alone can perform operations relative to the particular data item. When the client has finished performing operations relative to the particular data item, the client can release the exclusive lock on the particular data item, thereby making the particular data item available for access by other clients.

As the quantity of data stored within the shard system grows, the capacity of the existing shards in the system might become inadequate to contain all of the data that is going to be stored in the system. It can be desirable, under those circumstances, to add one or more new shards to the system. The addition of new shards can involve the addition of new hardware computing and storage devices to contain and manage new databases. In order to attempt to balance the client access load among the shards, so that no one subset of shards becomes disproportionately burdened with client requests, the addition of new shards to the system can precipitate a redistribution of the system's stored data items among the augmented group of shards. The redistribution event, or rebalancing event, can cause data items that were formerly stored on one shard to be re-located to another shard—potentially, but not necessarily, to a newly added shard. Under one approach, rebalancing processes can obtain exclusive locks on the data items that are to be moved. After obtaining the exclusive locks on the data items, the rebalancing processes can move those data items from old shards to the new shards that have been determined by a revised hash function to be the destination for those data items. After moving the data items, the rebalancing processes can release the exclusive locks on those data items.

For as long as exclusive locks have existed, some drawbacks have attended their uses. One drawback is that while a data item's exclusive lock is held by a process, no other process can access that data item. Thus, under the lock-using rebalancing approach discussed above, clients may be largely unable to perform operations relative to the shard system while the rebalancing event proceeds; no client can obtain an exclusive lock on a data item while a rebalancing process holds that exclusive lock. Even when the rebalancing event is not ongoing, the overhead involved in clients' acquisition, maintenance, and release of locks—to guard against concurrent multiple client access—can be significant and burdensome. Even ignoring the effects of rebalancing events, the use of locks within a shard system can negatively impact system efficiency and performance. Perhaps worse still, unexpected failures within the shard system can cause a lock-holding process (which could be, for example, a client or a rebalancing process) to freeze up or otherwise quit functioning properly. Under such circumstances, the non-functional process may retain an exclusive lock on a particular data item until some timer expires, at which time the non-functional process may be terminated, and the locks it held forcibly released. Other processes, including clients and rebalancing processes, are consequently forced to wait for the timer's expiration before proceeding with their intended tasks relative to that particular data item. Especially if the operations to be performed relative to the particular data item are just one step within a strictly ordered sequence of operations to be performed relative to multiple separate data items, such forced waiting can cause the performance of the entire shard system to degrade noticeably. Dependencies imposed by orders in which operations often need to be performed can cause these kinds of complications to cascade.

DETAILED DESCRIPTION

In the following description, for the purposes of explanation, specific details are set forth in order to provide a thorough understanding of embodiments of the invention. However, it will be apparent that the invention may be practiced without these specific details.

According to an embodiment of the invention, multiple clients can be enabled to perform operations relative to data items in a shard system asynchronously to each other without the use by those clients of exclusive locks. Furthermore, according to an embodiment of the invention, a rebalancing event, in which data items are redistributed automatically among a set of shards due to a modification (addition or impending removal) of the quantity of shards in the system, can be performed without the use of exclusive locks by clients. Additionally, in an embodiment of the invention, clients can continue to perform operations relative to at least some of the data items in the shard system even while rebalancing processes are redistributing at least some of the data items asynchronously during a system-wide rebalancing event. The programmatic code that provides these features can be located exclusively on the clients rather than the shard servers. All of these benefits can be obtained without sacrificing data consistency within the shard system.

Example Scalable Shard System

Figure 1:
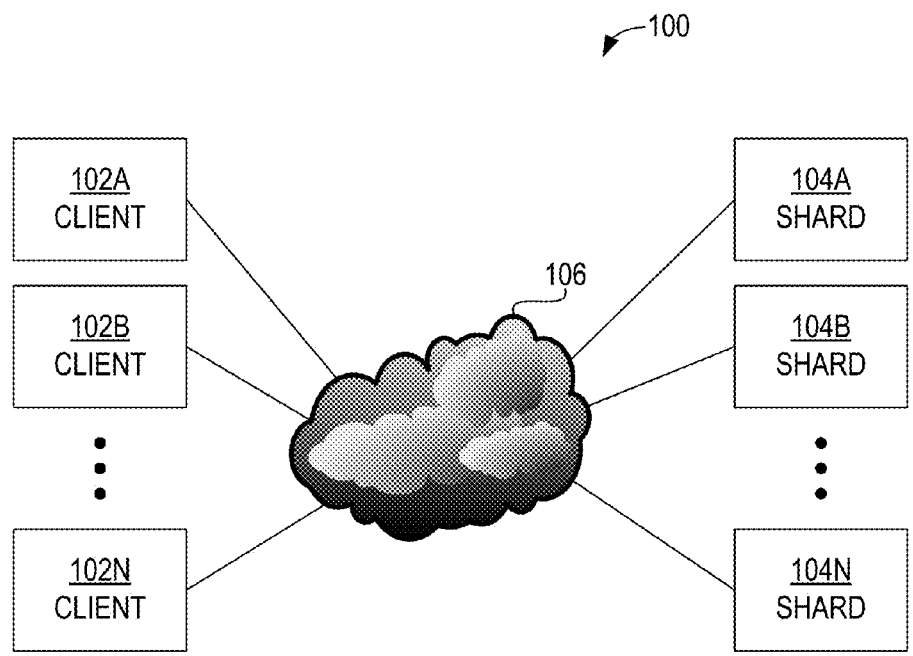
FIG. 1 is a block diagram illustrating an example of a scalable shard system in which multiple clients can access data items that have been distributed among multiple database shards, according to an embodiment of the invention.

FIG. 1 is a block diagram illustrating an example of a scalable shard system 100 in which multiple clients can access data items that have been distributed among multiple database shards, according to an embodiment of the invention. Shard system 100 includes clients 102A-N and shards 104A-N. The quantities of clients and shards in system 100 can vary. Each of shards 104A-N can be a separate and independent database that does not need to be aware of any other shard within system 100. Each of shards 104A-N can include a separate database server and relational database, for example. Although databases are discussed herein as a concrete example, embodiments of the invention can be applied to a variety of kinds of data repositories (e.g., Lightweight Directory Access Protocol (LDAP) directories, flat files, associative memories, etc.) other than databases. Each of clients 102A-N can be a separate computing system that can operate independently of each other of clients 102A-N. For example, clients 102A-N can be desktop computers, laptop computers, mobile devices, etc.

Clients 102A-N can interact with shards 104A-N through a network 106. Network 106 can be, or can include, a local area network (LAN), a wide area network (WAN), and/or the Internet. Communication over network 106 can be achieved through a suite of network communication protocols such as Ethernet, Transmission Control Protocol/Internet Protocol (TCP/IP), Hypertext Transfer Protocol (HTTP), Simple Object Access Protocol (SOAP), Open Database Connectivity (ODBC), etc. Each of clients 102A-N can execute a separate instance of a software program that utilizes a hash function in order to calculate, based on the primary key of a particular data item, the identity of a particular shard, among shards 104A-N, on which that particular data item either has been stored or is to be stored. Such data items can be separate records possessing different values for similar attribute sets. At least in one embodiment, such data items can be stored within shards 104A-N as separate rows within one or more relational database tables. With very specific exceptions discussed below that are applicable to system 100 during rebalancing events, each data item is located on only one of shards 104A-N at any particular moment in time. A rebalancing event can potentially cause various data items to be relocated from one shard to another shard. In an embodiment of the invention, the sequence of activities involved in a client's performance of an operation during a rebalancing event can differ from the sequence of activities involved in that client's performance of that same type of operation during "normal" system states occurring outside of a rebalancing event.

Generally, in order to perform an operation relative to a data item that already is stored on a particular one of shards 104A-N, a particular client of clients 102A-N can first determine (e.g., based on the hash function) the shard on which that data item is currently stored. During a rebalancing event, the particular client can perform checks to ensure that the particular client will be operating on the correct copy of the data item, to compensate for the possibility that the data item might have been relocated or deleted asynchronously to the particular client's activities. Although during normal system states only one copy of a data item can exist anywhere in system 100, during a rebalancing event it is possible for multiple copies—different versions—of a data item to be present temporarily within system 100. In performing these checks, the particular client can make use of version information (discussed in greater detail below) that is stored with each copy of each data item. Based at least in part on such version information, the particular client can ensure that the operation, if performed, will be performed relative to the copy of the data item stored on the shard on which the data item was most recently placed. The particular client's performance of the operation during a rebalancing event can involve the creation of a new copy of the data item on a shard separate from the shard on which another copy of the data item previously existed. In an embodiment, the operation can involve the execution of one or more instructions relative to the data item. For example, such instructions can take the form of query language instructions—Structured Query Language (SQL) instructions being just one specific possibility. After the particular client's performance of the operation relative to a newest copy of the data item, a cleanup operation can be performed to remove old and outdated versions of the data item from shards on which the data item should no longer exist. Generally, data consistency within system 100 can be maintained in this manner without the use of locks by clients 102A-N.

According to an embodiment of the invention, system 100 is scalable because shards can be added to (or removed from) system 100. The modification of the quantity of shards 104A-N can cause a rebalancing event to occur within system 100. During the rebalancing event, rebalancing processes can re-hash each data item's primary key based on the new quantity of shards instead of the old quantity, thereby determining the identity of the shard (different or the same) on which that data item should be located as of the conclusion of the rebalancing event. The rebalancing processes can then relocate data items from shard to shard using techniques discussed in greater detail below. The relocation can involve the creation and deletion of copies of the data items that would not exist within system 100 outside of the rebalancing event. The rebalancing processes can execute asynchronously to software executing on clients 102A-N. Beneficially, clients 102A-N can continue to perform operations relative to data items during the rebalancing operation, at least in part by adjusting the sequence of activities that clients 102A-N perform during the rebalancing operation.

Versions and Tombstone Attributes

As is mentioned above, in an embodiment of the invention, each copy of a particular data item can be stored in association with version information. In an embodiment, such version information can take the form of a system-wide version number that is incremented each time that rebalancing event occurs in system 100. Thus, for example, if an existing data item's version number is 3, and if the system's current version number is 4 at the time a new copy of the data item is created on a different shard during a rebalancing event, then the new copy of that data item will have version number 4. By examining the version information of two separate copies of a data item, which may exist during a rebalancing event, a client can determine which copy is the newer version, and can perform operations relative to that copy. Additionally, by examining the version information of two separate copies of a data item, which may exist during a rebalancing event, a rebalancing process can determine which copy is the older version, and therefore ought to be removed from the shard on which that copy is located.

Operations that a client performs can involve deleting a data item from a shard. In an embodiment, a client's performance of a deletion operation relative to a data item does not instantly remove all traces of that data item from the shard on which it was located. Instead, in an embodiment, each data item has an attribute called a "tombstone" whose value can be set to true (if that copy of the data item on that shard has been deleted) or false (if that copy of the data item on that shard has not been deleted). The setting of a data item's tombstone attribute to "true" avoids ambiguous situations that otherwise might occur when a data item's absence on a shard could be due either to deletion or to movement to another shard as part of a rebalancing event. In an embodiment, only rebalancing processes (and not clients) are permitted to remove data items from shards completely.

System State Transitions

As is discussed above, at different moments of time, system 100 could be in a state in which it is performing a rebalancing event, or system 100 could be in a state outside of such a rebalancing event. Also as is discussed above, the sequences of activities that clients 102A-N perform as part of operations relative to data items during a rebalancing event can differ from the sequences of activities that clients 102A-N perform as parts of operations of the same type during states in which an rebalancing event is not occurring. Viewed in a simplified manner, during the "normal" state that exists while system 100 is not undergoing a rebalancing event, clients 102A-N may perform operations relative to data items using simple, highly efficient "naïve" techniques that may lack safeguards that protect against certain kinds of inconsistencies. In contrast, during a state that exists while system 100 is undergoing a rebalancing event, clients 102A-N may perform the same types of operations using more complex, more cautious techniques that impose such safeguards. Such safeguards, which might be unnecessary outside of rebalancing events, can be suitable during rebalancing events.

Figure 2:
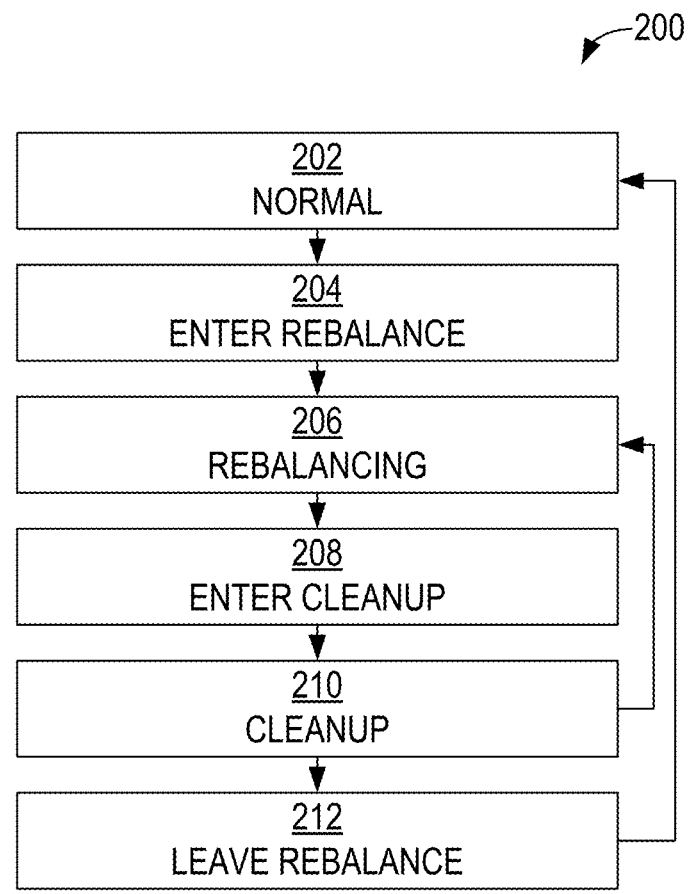
FIG. 2 is a state diagram that illustrates the various states in which system can exist at various moments in time, and the possible transitions between those states, according to an embodiment of the invention.

FIG. 2 is a state diagram that illustrates the various states 200 in which clients 102A-N can exist at various moments in time, and the possible transitions between those states, according to an embodiment of the invention. States 200 can include a normal state 202, an enter rebalance state 204, a rebalancing state 206, an enter cleanup state 208, a cleanup state 210, and a leave rebalance state 212. In one embodiment, clients 102A-N are permitted to perform operations relative to data items stored within shards 104A-N only during normal state 202 and rebalancing state 206, which are likely to be the states in which clients 102A-N are during the vast majority of the time. Although clients 102A-N will usually be in the same state, separate ones of those clients can briefly be in different states during state transitions, as will be seen from the discussion below.

According to an embodiment, clients 102A-N can initialize in normal state 202. Clients 102A-N can begin new operations while in normal state 202. A notification mechanism can inform each of clients 102A-N that one or more shards have been added to or are going to be removed from system 100. In response to such a notification, each of clients 102A-N can wait for its pending operations to complete, and then that client can transition to enter rebalance state 204. Clients 102A-N do not begin new operations while in enter rebalance state 204; clients 102A-N can queue up operations to be performed. When all of clients 102A-N have transitioned to enter rebalance state 204, each of clients 102A-N can transition to rebalancing state 206. Once clients 102A-N have entered rebalancing state 206, rebalancing processes can proceed to move data items from source shards to destination shards. In an embodiment of the invention, the current version number, with which new data item copies will become associated from that moment onward, can be incremented upon the entry of clients 102A-N into rebalancing state 206. Clients 102A-N can begin new operations (potentially including queued up operations) while in rebalancing state 206. When the rebalancing processes have moved all data items that are to be relocated, a notification mechanism can inform each of clients 102A-N of this fact. In response to such a notification, each of clients 102A-N can wait for its pending operations to complete, and then that client can transition to enter cleanup state 208. Clients 102A-N do not begin new operations while in enter cleanup state 208; clients 102A-N can queue up operations to be performed. When all of clients 102A-N have transitioned to enter cleanup state 208, each of clients 102A-N can transition to cleanup state 210. Once clients 102A-N have entered cleanup state 210, rebalancing processes can proceed to remove, from the shards, data item copies that should no longer exist on any shard. In an embodiment, while clients 102A-N are in cleanup state 210, rebalancing processes can remove, from the shards, all data item copies having a "true" tombstone attribute value. Additionally, in an embodiment, while clients 102A-N are in cleanup state 210, rebalancing processes can remove, from the shards, all data item copies having a version number attribute value that is less than the system's current version number. Clients 102A-N do not begin new operations while in cleanup state 210; clients 102A-N can queue up operations to be performed. When the rebalancing processes have removed all data item copies that are to be removed, a notification mechanism can inform each of clients 102A-N of this fact. In response to such a notification, each of clients 102A-N can transition to leave rebalance state 212. Clients 102A-N do not begin new operations while in leave rebalance state 212; clients 102A-N can queue up operations to be performed. When all of clients 102A-N have transitioned to leave rebalance state 212, each of clients 102A-N can transition back to normal state 202. Clients 102A-N can begin new operations (potentially including queued up operations) while in normal state 202.

As is discussed above, while clients 102A-N are in rebalancing state 206, clients 102A-N can perform operations in a more cautious manner than then manner in which clients 102A-N would perform the same types of operations while in normal state 202. The manner in which clients 102A-N can perform operations while in rebalancing state 206 can guarantee data consistency in spite of the concurrent asynchronous execution of rebalancing processes that may be relocating data items from shard to shard—a concern that does not exist in normal state 202. Discussed below are techniques for performing various different types of operations in this more cautious, consistency-guaranteeing manner while in rebalancing state 206.

Add Operations

Figure 3:
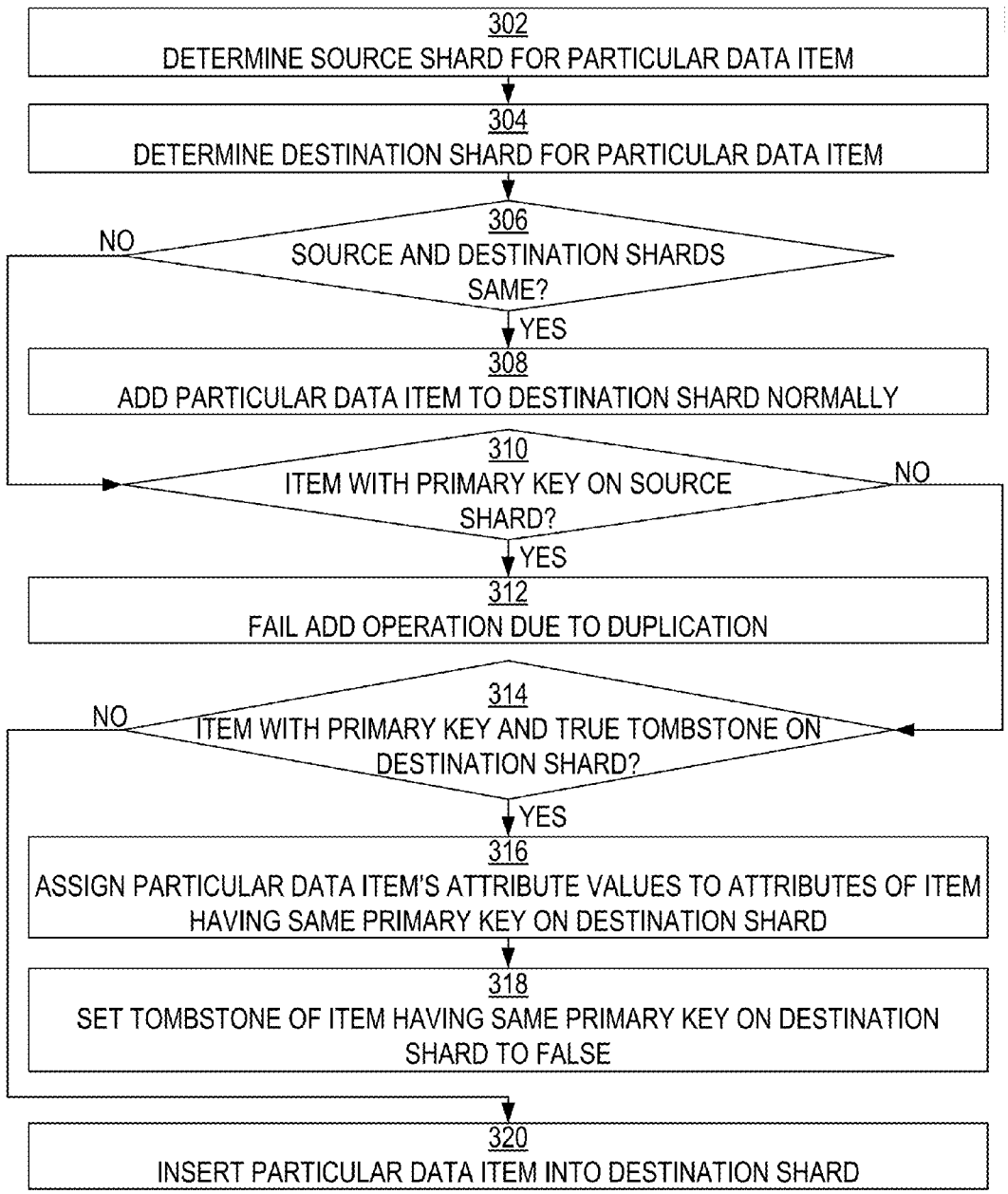
FIG. 3 is a flow diagram that illustrates an example of a technique for performing an add operation while in the rebalancing state, according to an embodiment of the invention.

FIG. 3 is a flow diagram that illustrates an example of a technique 300 for performing an add operation while in the rebalancing state, according to an embodiment of the invention. Although technique 300 is illustrated as including specific activities performed in a specific order, alternative embodiments of the invention can involve techniques having additional, fewer, or different activities. Any of clients 102A-N can perform technique 300. In block 302, a client can determine the identity of the source shard on which a particular data item would have been located prior to the change in shard quantity. This determination can be achieved, for example, by calculating the particular data item's primary key modulo the old shard quantity. In block 304, the client can determine the identity of the destination shard on which the particular data item is to be located following the change in shard quantity. This determination can be achieved, for example, by calculating the particular data item's primary key modulo the new shard quantity. In block 306, the client can determine whether the identity of the source shard is the same as the identity of the destination shard. If the identities are the same, then control passes to block 308. Otherwise, control passes to block 310.

In block 308, the client can add the particular data item to the destination shard in the normal, naïve, highly efficient standard manner for performing an add operation. At this point, technique 300 terminates.

Alternatively, in block 310, the client can determine whether a data item having the particular data item's primary key already exists on the source shard. If a data item having the particular data item's primary key already exists on the source shard, then control passes to block 312. Otherwise, control passes to block 314.

In block 312, the client can conclude that the particular data item duplicates a data item already existing in the shard system, and can refrain from performing the add operation. The client can signify to a user that the add operation was prevented due to duplication. At this point, technique 300 terminates.

Alternatively, in block 314, the client can determine whether there already exists, on the destination shard, a data item having both (a) the particular data item's primary key and (b) a tombstone attribute value of "true." If there already exists, on the destination shard, a data item having both (a) the particular data item's primary key and (b) a tombstone attribute value of "true," then control passes to block 316. Otherwise, control passes to block 320.

In block 316, as part of an atomic action, the client can assign, to the attribute values of the data item having the particular data item's primary key (on the destination shard), the attribute values of the particular data item. This assignment essentially updates the data item existing on the destination shard. The client can assign the system's current version number to the data item's version number attribute. In block 318, as part of the same atomic action, the client can set the tombstone attribute value of the data item having the particular data item's primary key (on the destination shard) to "false." In an embodiment, the attribute value assignment of block 316 achieves the same result as that achieved by the activity of block 318, since the particular data item's tombstone attribute value will already be "false" prior to the assignment. The client can signify to a user that the add operation succeeded. At this point, technique 300 terminates.

Alternatively, in block 320, the client can insert the particular data item into the destination shard. The client can assign the system's current version number to the particular data item's version number attribute. The client can signify to a user that the add operation succeeded. At this point, technique 300 terminates. In an embodiment of the invention, the activities of blocks 314-320 are performed as a single atomic operation.

Update Operations

Figure 4:
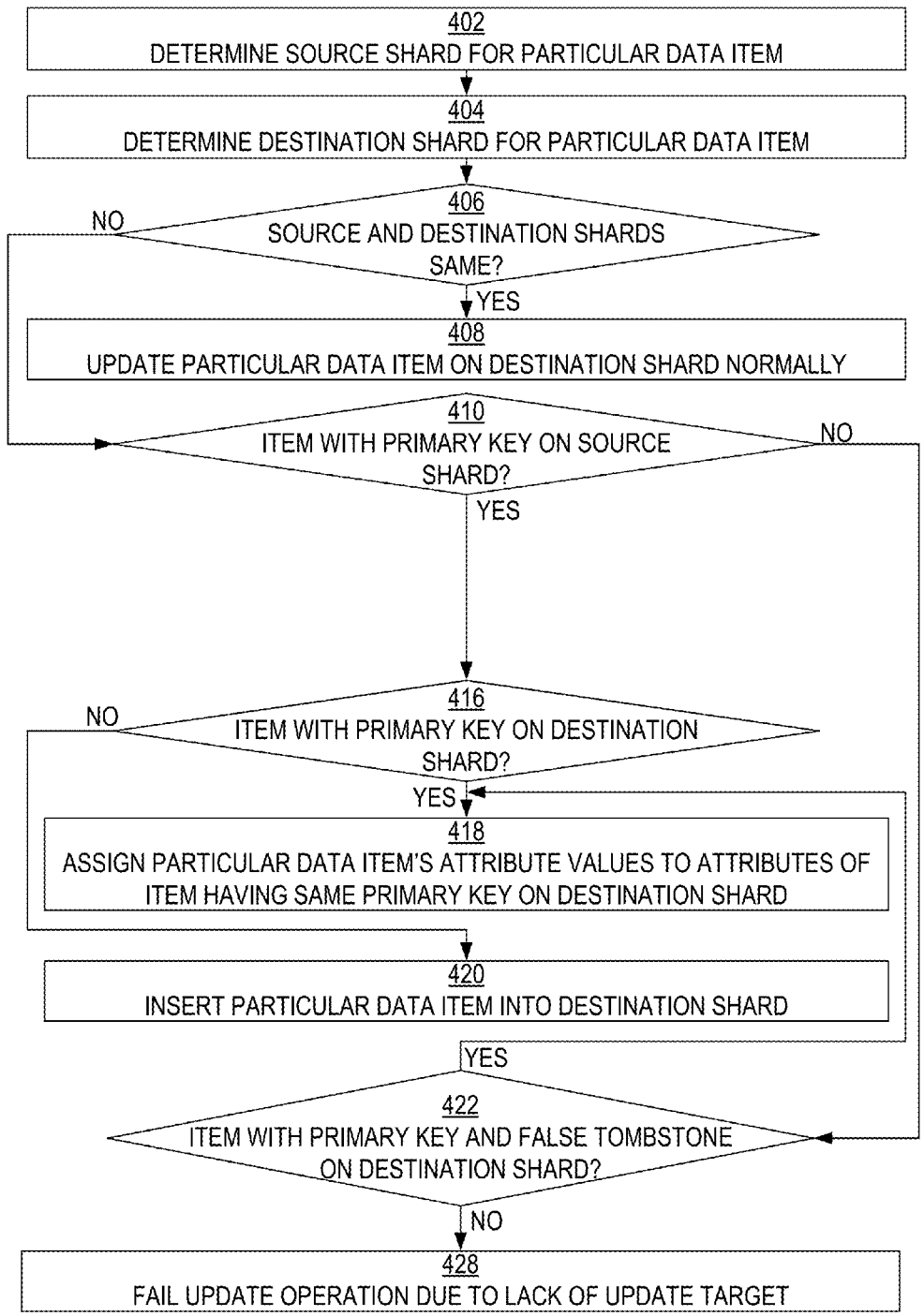
FIG. 4 is a flow diagram that illustrates an example of a technique for performing an update operation while in the rebalancing state, according to an embodiment of the invention.

FIG. 4 is a flow diagram that illustrates an example of a technique 400 for performing an update operation while in the rebalancing state, according to an embodiment of the invention. Although technique 400 is illustrated as including specific activities performed in a specific order, alternative embodiments of the invention can involve techniques having additional, fewer, or different activities. Any of clients 102A-N can perform technique 400. In block 402, a client can determine the identity of the source shard on which a particular data item would have been located prior to the change in shard quantity. This determination can be achieved, for example, by calculating the particular data item's primary key modulo the old shard quantity. In block 404, the client can determine the identity of the destination shard on which the particular data item is to be located following the change in shard quantity. This determination can be achieved, for example, by calculating the particular data item's primary key modulo the new shard quantity. In block 406, the client can determine whether the identity of the source shard is the same as the identity of the destination shard. If the identities are the same, then control passes to block 408. Otherwise, control passes to block 410.

In block 408, the client can update the particular data item on the destination shard in the normal, naïve, highly efficient standard manner for performing an update operation. At this point, technique 400 terminates.

Alternatively, in block 410, the client can determine whether a data item having the particular data item's primary key already exists on the source shard. If a data item having the particular data item's primary key already exists on the source shard, then control passes to block 416. Otherwise, control passes to block 422.

In block 416, the client can determine whether there already exists, on the destination shard, a data item having the particular data item's primary key. If there already exists, on the destination shard, a data item having the particular data item's primary key, then control passes to block 418. Otherwise, control passes to block 420.

In block 418, the client can assign, to the attribute values of the data item having the particular data item's primary key (on the destination shard), the attribute values of the particular data item. This assignment essentially updates the data item existing on the destination shard. The client can assign the system's current version number to the data item's version number attribute. The client can signify to a user that the update operation succeeded. At this point, technique 400 terminates.

Alternatively, in block 420, the client can insert the particular data item into the destination shard. The client can assign the system's current version number to the particular data item's version number attribute. The client can signify to a user that the update operation succeeded. At this point, technique 400 terminates.

Alternatively, in block 422, the client can determine whether there already exists, on the destination shard, a data item having both (a) the particular data item's primary key and (b) a tombstone attribute value of "false." If there already exists, on the destination shard, a data item having both (a) the particular data item's primary key and (b) a tombstone attribute value of "false," then control passes to block 418. Otherwise, control passes to block 428.

Alternatively, in block 428, the client can refrain from performing the update operation. The client can signify to a user that the update operation failed (because there was no data item to update). At this point, technique 400 terminates.

Delete Operations

Figure 5:
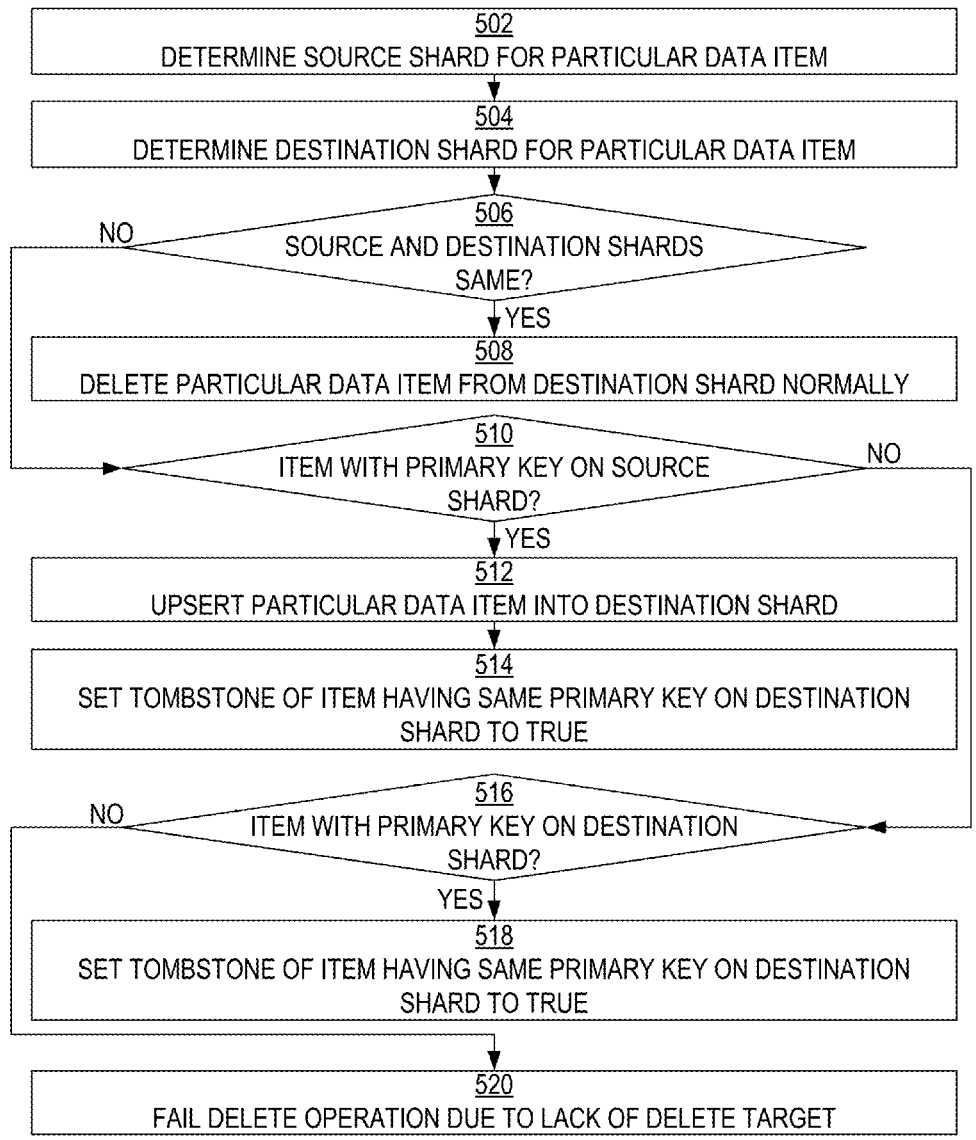
FIG. 5 is a flow diagram that illustrates an example of a technique for performing a delete operation while in the rebalancing state, according to an embodiment of the invention.

FIG. 5 is a flow diagram that illustrates an example of a technique 500 for performing a delete operation while in the rebalancing state, according to an embodiment of the invention. Although technique 500 is illustrated as including specific activities performed in a specific order, alternative embodiments of the invention can involve techniques having additional, fewer, or different activities. Any of clients 102A-N can perform technique 500. In block 502, a client can determine the identity of the source shard on which a particular data item would have been located prior to the change in shard quantity. This determination can be achieved, for example, by calculating the particular data item's primary key modulo the old shard quantity. In block 504, the client can determine the identity of the destination shard on which the particular data item is to be located following the change in shard quantity. This determination can be achieved, for example, by calculating the particular data item's primary key modulo the new shard quantity. In block 506, the client can determine whether the identity of the source shard is the same as the identity of the destination shard. If the identities are the same, then control passes to block 508. Otherwise, control passes to block 510.

In block 508, the client can delete the particular data item on the destination shard in the normal, naïve, highly efficient standard manner for performing a delete operation. At this point, technique 500 terminates.

Alternatively, in block 510, as part of an atomic action, the client can determine whether a data item having the particular data item's primary key already exists on the source shard. If a data item having the particular data item's primary key already exists on the source shard, then control passes to block 512. Otherwise, control passes to block 516.

In block 512, as part of the atomic action, the client can upsert the particular data item into the destination shard. An upsert is defined as: (1) an insert if the object identified by the primary key does not exist in the database (i.e., the destination shard), or (2) an update if the object identified by the primary key does exist in the database (i.e., the destination shard). In block 514, as part of the atomic action, the client can set the value of the particular data item's tombstone attribute to "true." The client can assign the system's current version number to the particular data item's version number attribute. The client can signify to a user that the delete operation succeeded. At this point, technique 500 terminates.

Alternatively, in block 516, the client can determine whether a data item having the particular data item's primary key already exists on the destination shard. If a data item having the particular data item's primary key already exists on the destination shard, then control passes to block 518. Otherwise, control passes to block 520.

In block 518, the client can set the value of the data item's tombstone attribute to "true" (on the destination shard). The client can assign the system's current version number to the data item's version number attribute. The client can signify to a user that the delete operation succeeded. At this point, technique 500 terminates.

Alternatively, in block 520, the client can refrain from performing the delete operation. The client can signify to a user that the delete operation failed (because there was no data item to delete). At this point, technique 500 terminates.

Get Operations

Figure 6A:
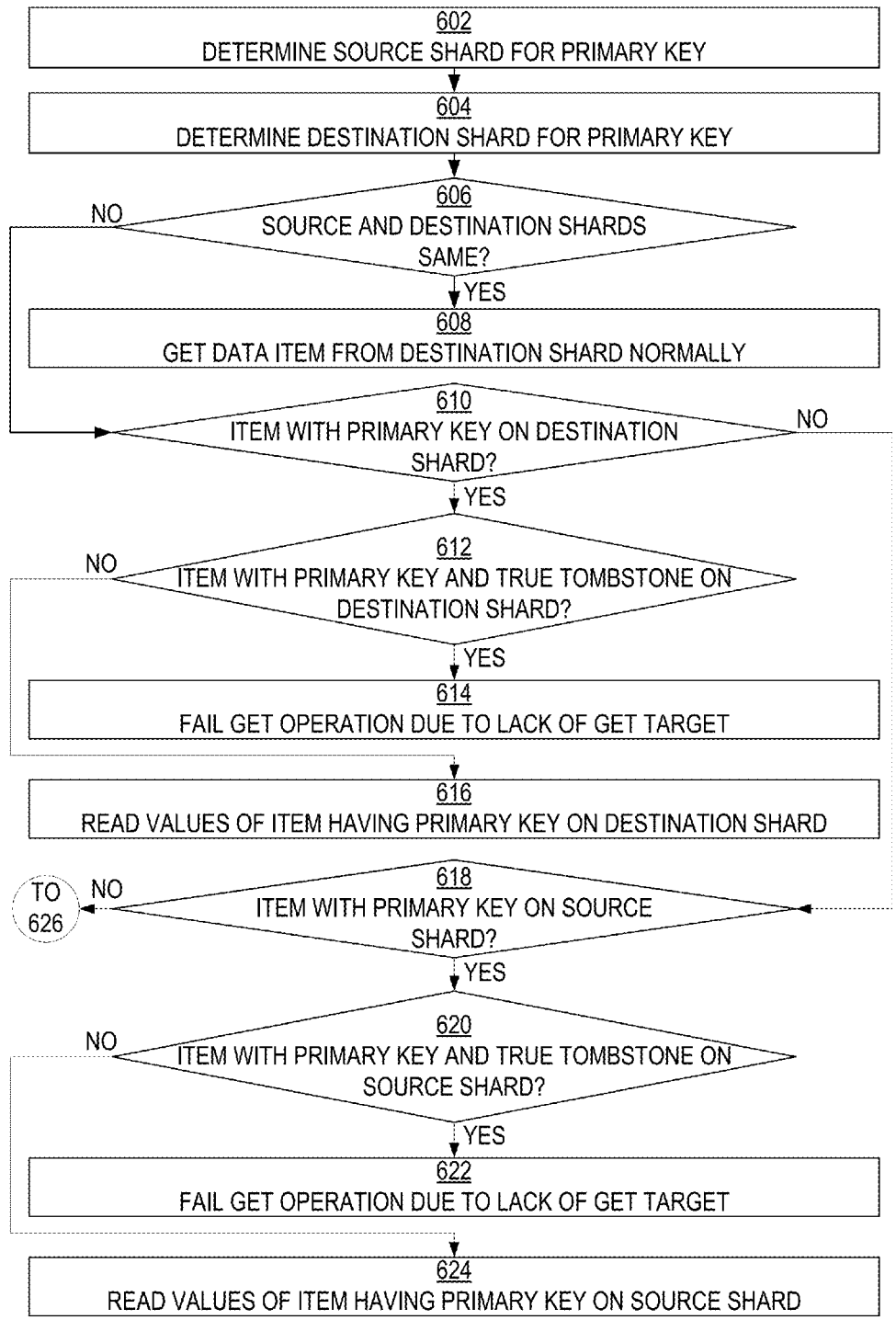
FIGS. 6A-6B are flow diagrams that illustrate an example of a technique for performing a get operation while in the rebalancing state, according to an embodiment of the invention.
Figure 6B:
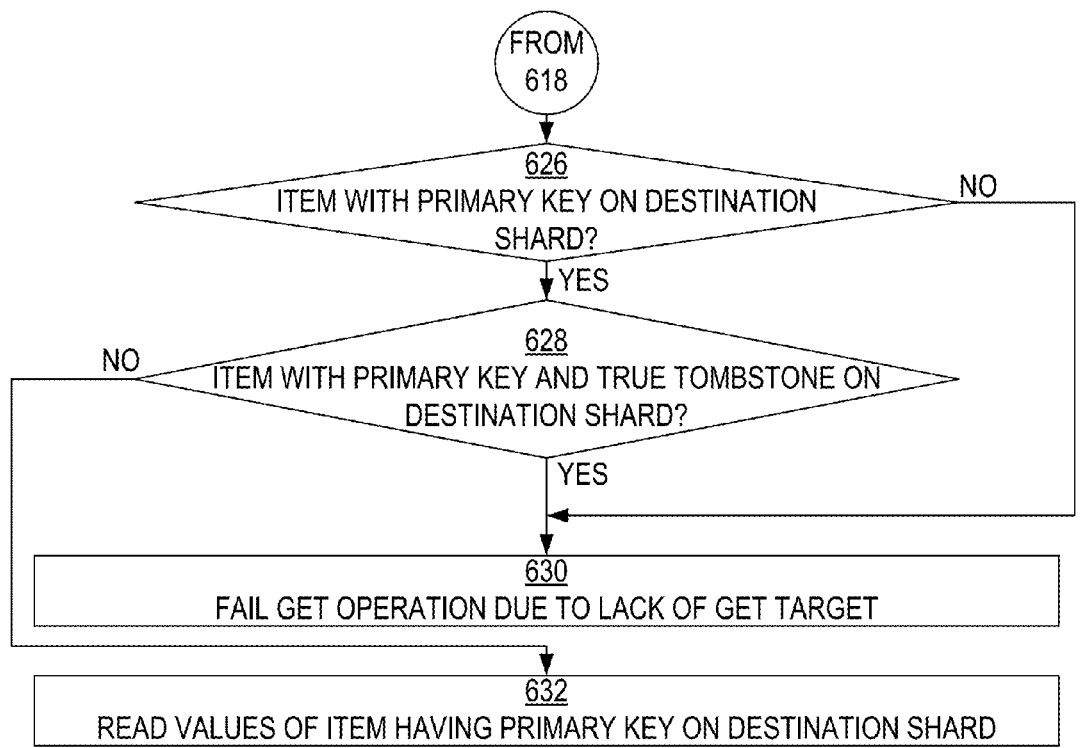

FIGS. 6A-6B are flow diagrams that illustrate an example of a technique 600 for performing a get operation while in the rebalancing state, according to an embodiment of the invention. In an embodiment, the get operation can read and return the attribute values of a data item having a client-specified primary key. Although technique 600 is illustrated as including specific activities performed in a specific order, alternative embodiments of the invention can involve techniques having additional, fewer, or different activities. Any of clients 102A-N can perform technique 600. Referring first to FIG. 6A, in block 602, a client can determine the identity of the source shard on which a particular data item having a specified primary key would have been located prior to the change in shard quantity. This determination can be achieved, for example, by calculating the specified primary key modulo the old shard quantity. In block 604, the client can determine the identity of the destination shard on which the particular data item having the specified primary key is to be located following the change in shard quantity. This determination can be achieved, for example, by calculating the specified primary key modulo the new shard quantity. In block 606, the client can determine whether the identity of the source shard is the same as the identity of the destination shard. If the identities are the same, then control passes to block 608. Otherwise, control passes to block 610.

In block 608, the client can perform a get operation relative to a particular data item having the specified primary key on the destination shard in the normal, naïve, highly efficient standard manner for performing a get operation. At this point, technique 600 terminates.

Alternatively, in block 610, the client can determine whether a data item having the specified primary key already exists on the destination shard. If a data item having the specified primary key already exists on the destination shard, then control passes to block 612. Otherwise, control passes to block 618.

In block 612, the client can determine whether the data item having the specified primary key on the destination shard has a "true" tombstone attribute value. If the data item having the specified primary key on the destination shard has a "true" tombstone attribute value, then control passes to block 614. Otherwise, control passes to block 616.

In block 614, the client can refrain from performing the get operation. The client can signify to a user that the get operation failed (because no data item having the specified primary key was found). At this point, technique 600 terminates.

Alternatively, in block 616, the client can read the attribute values of the data having the specified primary key on the destination shard. The client can present these attribute values to a user, coincidentally signifying that the get operation succeeded. At this point, technique 600 terminates.

Alternatively, in block 618, the client can determine whether a data item having the specified primary key already exists on the source shard. If a data item having the specified primary key already exists on the source shard, then control passes to block 620. Otherwise, control passes to block 626 on FIG. 6B.

Alternatively, in block 620, the client can determine whether the data item having the specified primary key on the source shard has a "true" tombstone attribute value. If the data item having the specified primary key on the source shard has a "true" tombstone attribute value, then control passes to block 622. Otherwise, control passes to block 624.

In block 622, the client can refrain from performing the get operation. The client can signify to a user that the get operation failed (because no data item having the specified primary key was found). At this point, technique 600 terminates.

Alternatively, in block 624, the client can read the attribute values of the data having the specified primary key on the source shard. The client can present these attribute values to a user, coincidentally signifying that the get operation succeeded. At this point, technique 600 terminates.

Referring now to FIG. 6B, alternatively, in block 626, the client can determine (again) whether a data item having the specified primary key now exists on the destination shard. If a data item having the specified primary key now exists on the destination shard (e.g., as a consequence of a rebalancing process having recently moved that data item to the destination shard), then control passes to block 628. Otherwise, control passes to block 630.

In block 628, the client can determine whether the data item having the specified primary key on the destination shard has a "true" tombstone attribute value. If the data item having the specified primary key on the destination shard has a "true" tombstone attribute value, then control passes to block 630. Otherwise, control passes to block 632.

In block 630, the client can refrain from performing the get operation. The client can signify to a user that the get operation failed (because no data item having the specified primary key was found). At this point, technique 600 terminates.

Alternatively, in block 632, the client can read the attribute values of the data having the specified primary key on the destination shard. The client can present these attribute values to a user, coincidentally signifying that the get operation succeeded. At this point, technique 600 terminates.

Rebalancing Operations

Figure 7:
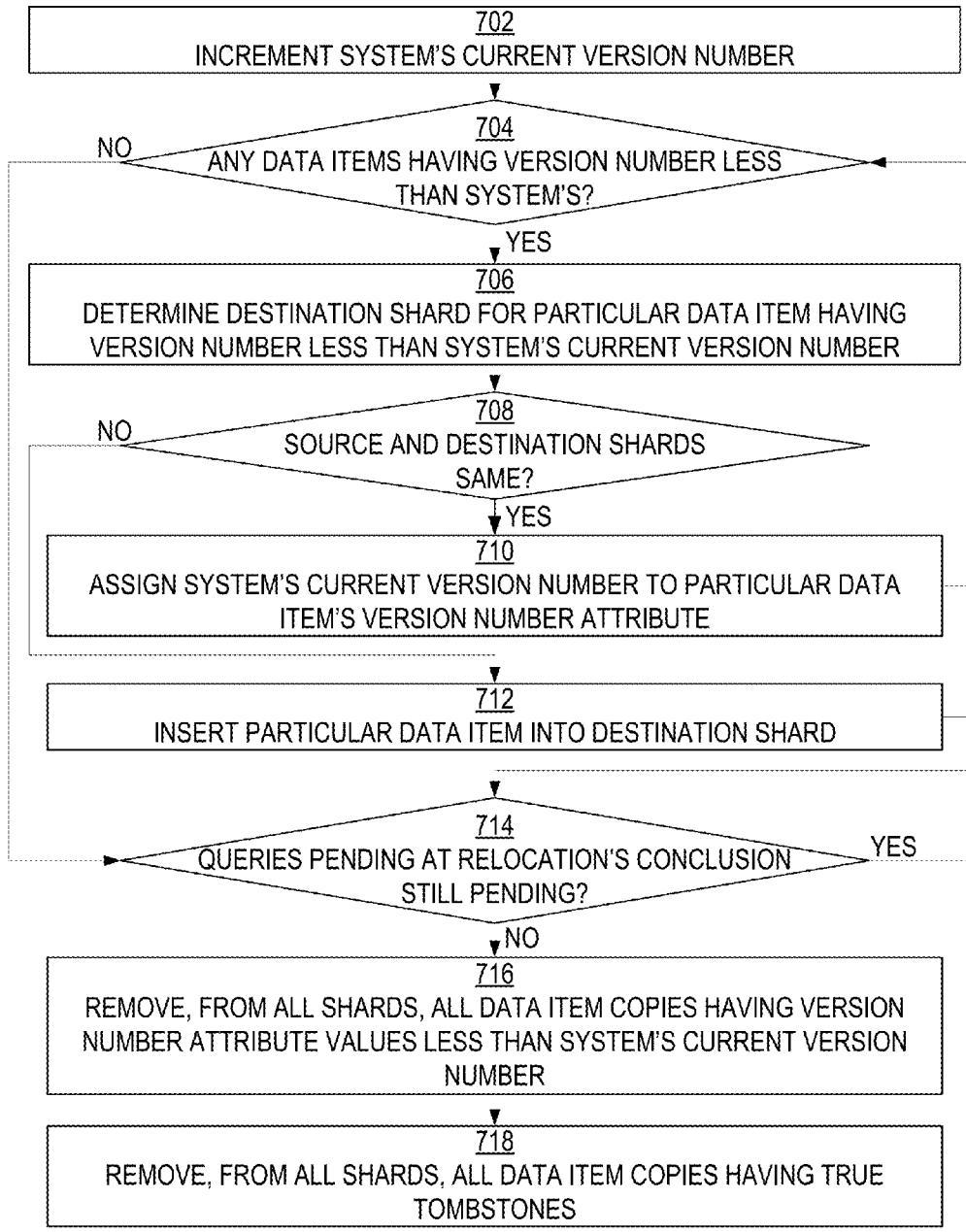
FIG. 7 is a flow diagram that illustrates an example of a technique for performing a rebalancing operation while in the rebalancing state (initially), according to an embodiment of the invention.

FIG. 7 is a flow diagram that illustrates an example of a technique 700 for performing a rebalancing operation while clients 102A-N are in the rebalancing state (initially), according to an embodiment of the invention. Although technique 700 is illustrated as including specific activities performed in a specific order, alternative embodiments of the invention can involve techniques having additional, fewer, or different activities. Rebalancing processes can perform technique 700 asynchronously to the performance of other types of operations by clients 102A-N.

In block 702, the system's current version number is incremented. In block 704, a rebalancing process can determine whether any shard still contains a data item whose version number attribute value is less than the system's current version number. If a shard contains a particular data item whose version number attribute value is less than the system's current version number, then control passes to block 706. Otherwise, the rebalancing processes have finished relocating data items for this particular rebalancing event, and control passes to block 714.

In block 706, the rebalancing process can determine the identity of the destination shard on which the particular data item is to be located following the change in shard quantity. This determination can be achieved, for example, by calculating the particular data item's primary key modulo the new shard quantity. In block 708, the rebalancing process can determine whether the identity of a source shard, on which the particular data item is currently located, is the same as the identity of the destination shard. If the identities are the same, then control passes to block 710. Otherwise, control passes to block 712.

In block 710, the rebalancing process can assign the system's current version number to the particular data item's version number attribute. Under such circumstances, the particular data item does not need to be relocated to a different shard. Control passes back to block 704.

Alternatively, in block 712, the rebalancing process can insert the particular data item into the destination shard. In one embodiment, potential conflicts can be ignored. The rebalancing process can assign the system's current version number to the particular data item's version number attribute. Significantly, in an embodiment, an old copy of the particular data item can remain on the source shard until the activities of blocks 716 and 718 are performed. Control passes back to block 704.

Alternatively, in block 714, the rebalancing process can determine whether any queries (e.g., from clients 102A-N) that had been executing as of the time that the rebalancing processes finished relocating data items are currently executing against any of the shards (e.g., shards 104A-N). If at least one query that had been executing as of the time that the rebalancing processes finished relocating data items is currently executing against at least one shard, then control passes back to block 714. Otherwise, control passes to block 716.

After all queries that were pending as of the conclusion of the data item relocation have completed, in block 716, the rebalancing processes can remove, from all shards, all data item copies whose version number attribute value is less than the system's current version number. In block 718, the rebalancing processes can remove, from all shards, all data item copies whose tombstone attribute values are "true." In an embodiment, the activities of blocks 716 and 718 can be performed during cleanup phase 210 discussed above in connection with FIG. 2.

Query Operations

Figure 8:
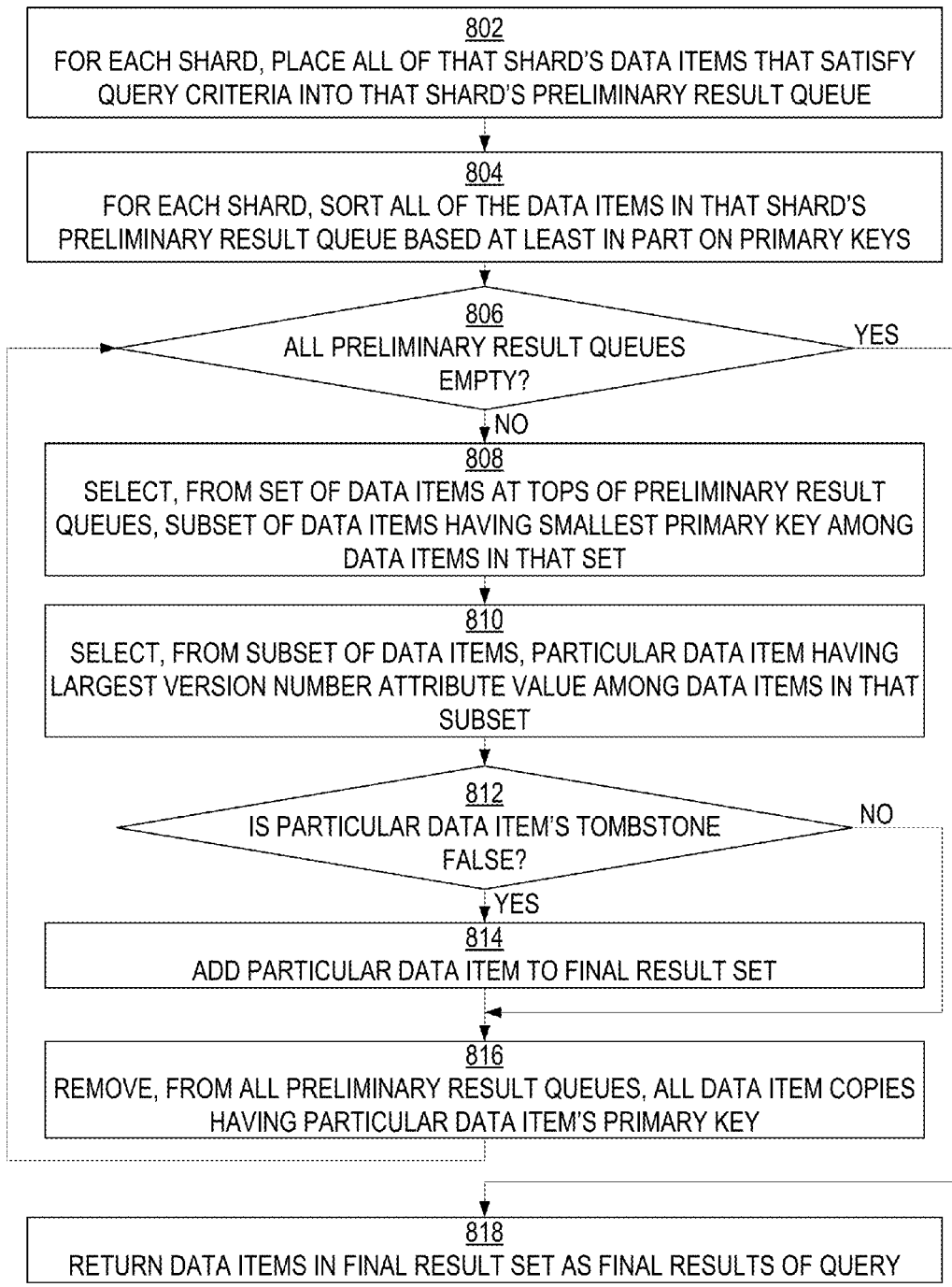
FIG. 8 is a flow diagram that illustrates an example of a technique for performing a query operation while in the rebalancing state, according to an embodiment of the invention.

FIG. 8 is a flow diagram that illustrates an example of a technique 800 for performing a query operation while in the rebalancing state, according to an embodiment of the invention. Although technique 800 is illustrated as including specific activities performed in a specific order, alternative embodiments of the invention can involve techniques having additional, fewer, or different activities. Any of clients 102A-N can perform technique 800, for example. Technique 800 can be performed concurrently with technique 700. In block 802, for each particular shard of shards 104A-N, all of the particular shard's data items that satisfy query-specified filtering criteria can be placed in a separate preliminary result queue for that particular shard. Each such preliminary result queue can start out empty. Thus, a separate preliminary result queue may be populated for each of shards 104A-N. In block 804, for each particular shard of shards 104A-N, the data items contained within that particular shard's preliminary result queue can be sorted based at least in part on those data items' primary keys. As a result, for example, each preliminary result queue can contain data items that are sorted such that the data item having the smallest primary key of data items in that preliminary result queue can be at the front of that preliminary result queue. In block 806, a determination can be made as to whether all of the shards' preliminary result queues are empty. If all of the shards' preliminary result queues are empty, then control passes to block 818. Otherwise, control passes to block 808.

In block 808, from the set of data items that are currently at the top of each shard's preliminary result queue, a subset of one or more data items having the smallest primary key among data items in that set can be selected. In block 810, from the subset of one or more data items selected in block 808, a particular data item having the largest version number attribute value can be selected. In block 812, a determination can be made as to whether the particular data item's tombstone attribute value is "false." If the particular data item's tombstone attribute value is "false," then control passes to block 814. Otherwise, control passes to block 816.

In block 814, the particular data item can be added to a final result set. The final result set can start out empty. Control passes to block 816. In block 816, all data item copies having the same primary key as the particular data item (including the particular data item itself) can be removed from all of the shards' preliminary result queues. This removal potentially can cause other data items to rise to the top of one or more of those queues. Control passes back to block 806.

Alternatively, in block 818, the data items in the final result set can be returned as the final results of the query operation.

Hardware Overview

Figure 9:
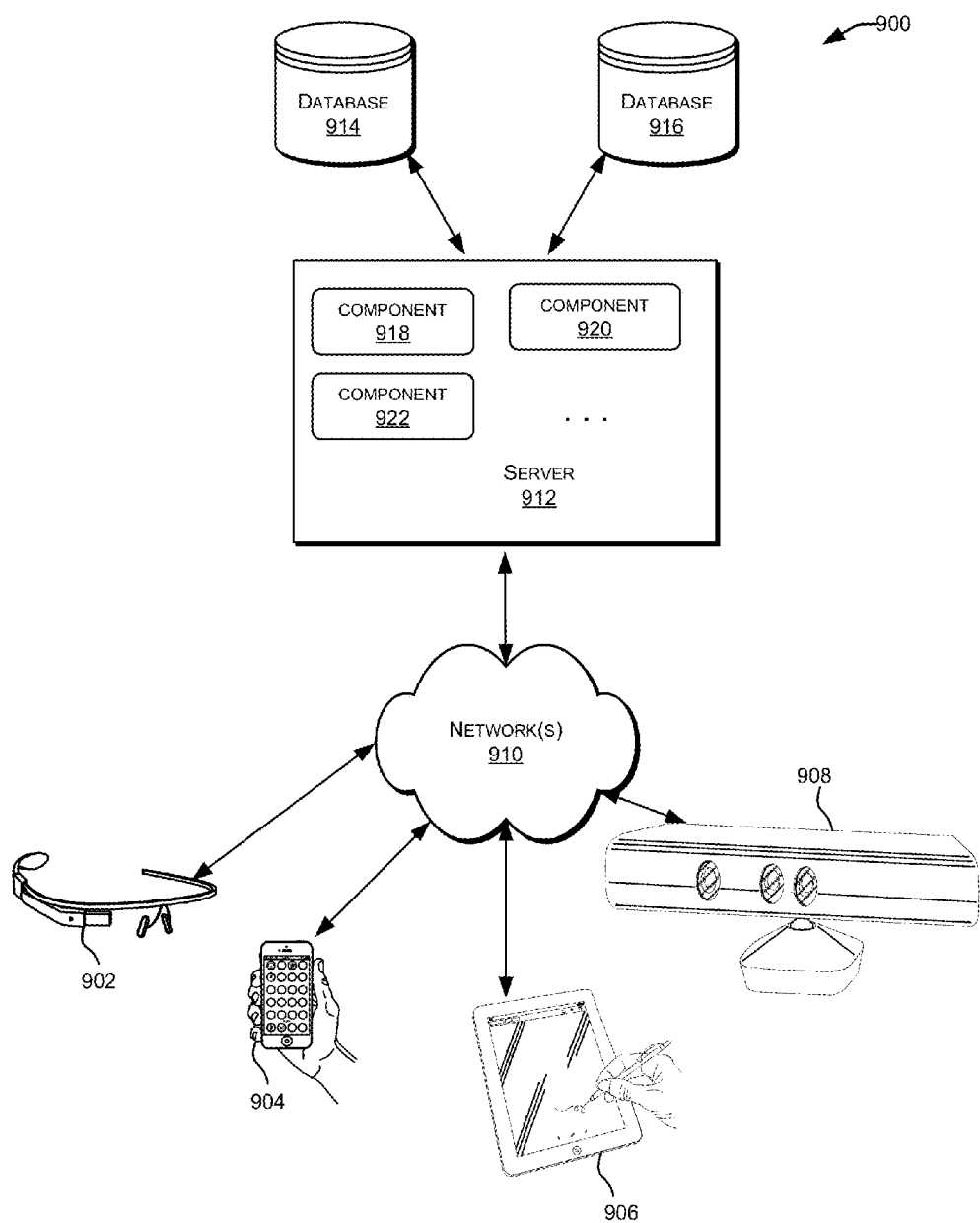
FIG. 9 depicts a simplified diagram of a distributed system for implementing one of the embodiments.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 902.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIXO servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, which are adapted to store, update, and retrieve data in response to SQL-formatted commands.

Figure 10:
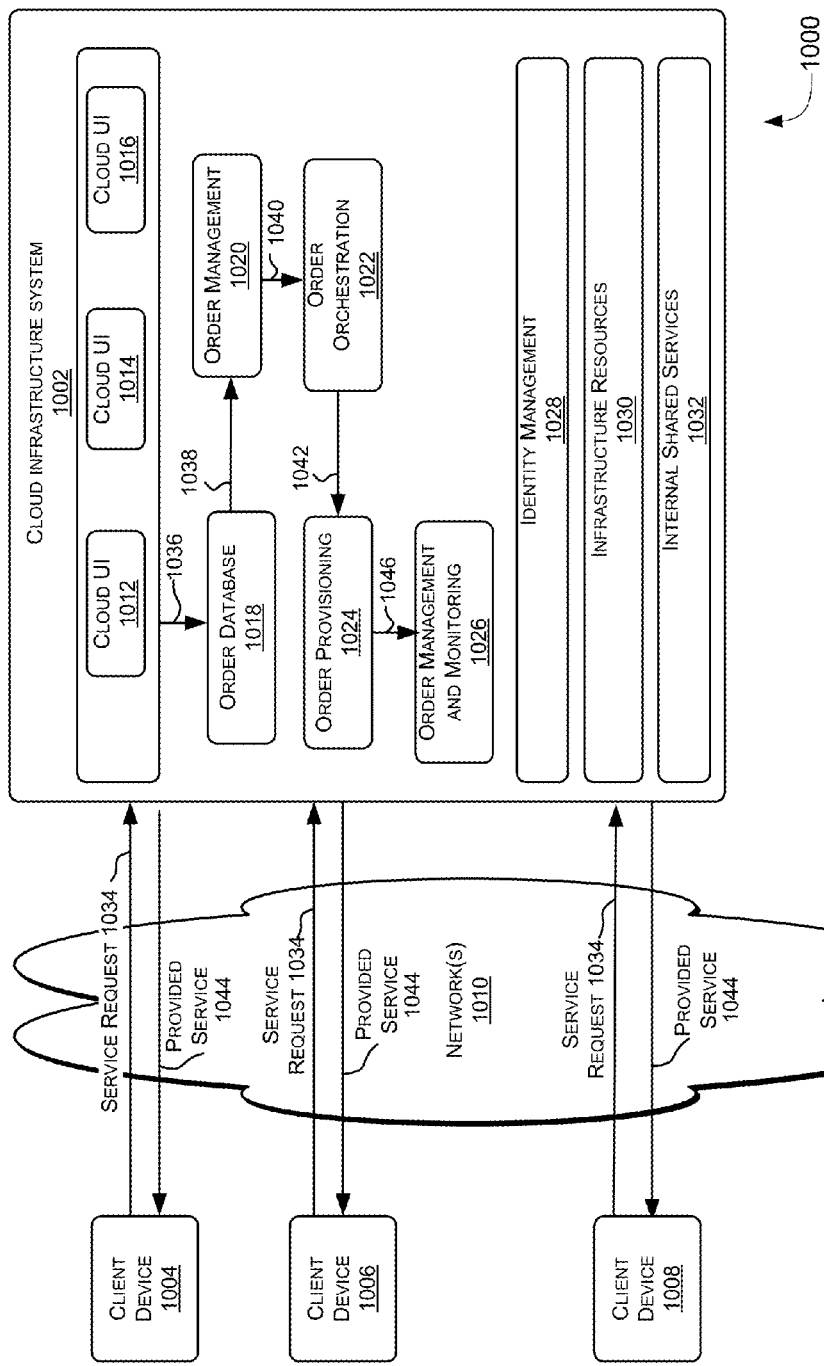
FIG. 10 is a simplified block diagram of components of a system environment by which services provided by the components of an embodiment system may be offered as cloud services, in accordance with an embodiment of the present disclosure.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the invention. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
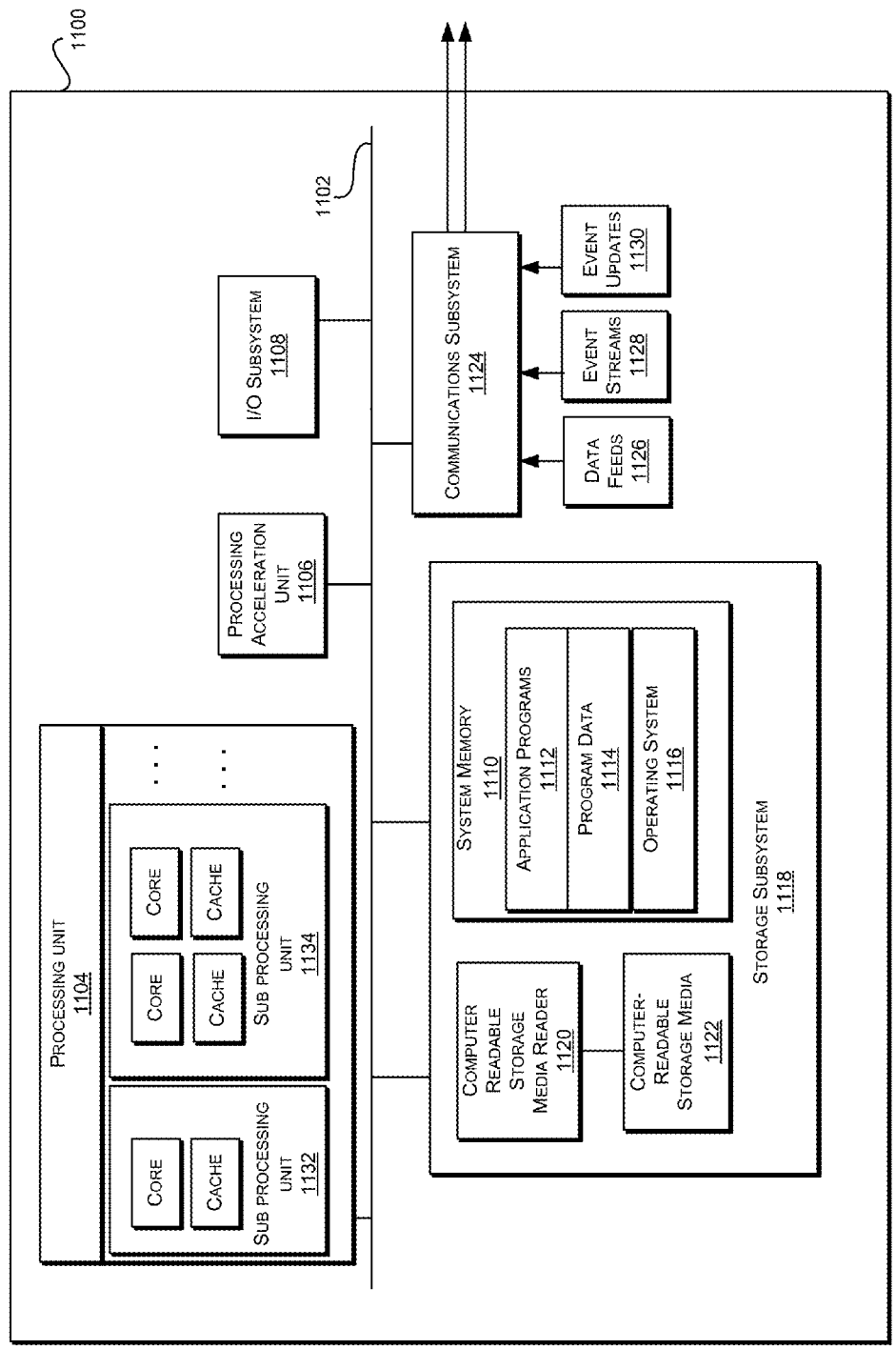
FIG. 11 illustrates an example of a computer system in which various embodiments of the present invention may be implemented.

FIG. 11 illustrates an example computer system 1100 in which various embodiments of the present invention may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present invention.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, which may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like. Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments. In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   determining a change in a quantity of shards in a multi-shard system that has a plurality of shards;
   in response to determining the change in the quantity of shards, transitioning a client from a normal state to a rebalancing state, wherein during the normal state, the client performs a type of operation relative to data items stored in the multi-shard system in a first manner, wherein during the rebalancing state, the client performs the type of operation relative to the data items stored in the multi-shard system in a second manner, wherein the second manner is different than the first manner, wherein during the rebalancing state, the client performs the type of operation without the client acquiring one or more exclusive locks relative to any of the data items, and wherein during the rebalancing state, the type of operation is performed based on:
   a first shard in the multi-shard system, the first shard including a data item stored at a first memory location in the first shard before the change in the quantity of shards, wherein the data item is one of the data items; and
   a second shard in the multi-shard system, the second shard including the data item stored at a second memory location in the second shard after the change in the quantity of shards;
   while the client is in the rebalancing state, determining, for one or more data items of the data items, one or more destination shards that are separate from one or more source shards, wherein the one or more source shards store the one or more data items during the normal state prior to transitioning the client from the normal state to the rebalancing state; and moving the one or more data items from the one or more source shards to the one or more destination shards while the client is in the rebalancing state.

2. The computer-implemented method of claim 1, further comprising:

while the one or more data items are being moved from the one or more source shards to the one or more destination shards, the client performing, asynchronously to the moving of the one or more data items, and relative to a data item, an operation of the type of operation in the second manner without acquiring an exclusive lock.

3. The computer-implemented method of claim 1, further comprising:

determining the one or more destination shards for the one or more data items by hashing primary keys of the data items based at least in part on the quantity of shards in the multi-shard system following the change in the quantity of shards; and in response to determining that the one or more data items have been moved from the one or more source shards to the one or more destination shards, transitioning the client from the rebalancing state to the normal state.

4. The computer-implemented method of claim 1, further comprising:

while the one or more data items are being moved from the one or more source shards to the one or more destination shards, the client performing an add operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be added after the change in the quantity of shards;

determining that no data item on the source shard has the primary key of the first data item;

determining that no data item on the destination shard has both a true tombstone attribute value and the primary key of the first data item; and inserting the first data item into the destination shard.

5. The computer-implemented method of claim 1, further comprising:

while the one or more data items are being moved from the source shards to the destination shards, the client performing an add operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be added after the change in the quantity of shards;

determining that no data item on the source shard has the first data item's primary key;

determining that a second data item on the destination shard has both a true tombstone attribute value and the first data item's primary key;

assigning, to one or more attributes of the second data item, attribute values of the first data item; and setting the second data item's tombstone attribute value to false.

6. The computer-implemented method of claim 1, further comprising:

while the one or more data items are being moved from the source shards to the destination shards, the client performing an update type of operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be located after the change in the quantity of shards;

determining that no data item on the source shard has the first data item's primary key;

determining that a second data item on the destination shard has both a false tombstone attribute value and the first data item's primary key; and assigning, to one or more attributes of the second data item, attribute values of the first data item.

7. The computer-implemented method of claim 1, further comprising:

while the one or more data items are being moved from the source shards to the destination shards, the client performing an update type of operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be located after the change in the quantity of shards;

determining that a second data item on the source shard has both the first data item's primary key and a false tombstone attribute value;

determining that a third data item on the destination shard has the first data item's primary key;

assigning, to one or more attributes of the third data item, attribute values of the first data item; and setting a version number of the third data item to a value different from a version number of the second data item.

8. The computer-implemented method of claim 1, further comprising:

while the one or more data items are being moved from the source shards to the destination shards, the client performing an update type of operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be located after the change in the quantity of shards;

determining that a second data item on the source shard has both the first data item's primary key and a false tombstone attribute value;

determining no data item on the destination shard has the first data item's primary key; and inserting the first data item into the destination shard with a version number that differs from a version number of the second data item.

9. The computer-implemented method of claim 1, further comprising:

while the one or more data items are being moved from the source shards to the destination shards, the client performing a delete type of operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be located after the change in the quantity of shards;

determining that a second data item on the source shard has the first data item's primary key;

upserting the first data item into the destination shard with a version number that differs from a version number of the second data item; and setting a tombstone attribute value of the first data item on the destination shard to true.

10. The computer-implemented method of claim 1, further comprising:

while the one or more data items are being moved from the source shards to the destination shards, the client performing a delete type of operation in the second manner relative to a first data item having a primary key at least in part by:

determining, based at least in part on a quantity of shards in the multi-shard system preceding the change in the quantity of shards, a particular source shard on which the first data item is stored prior to the change in the quantity of shards;

determining, based at least in part on a quantity of shards in the multi-shard system following the change in the quantity of shards, a particular destination shard on which the first data item is to be located after the change in the quantity of shards;

determining that no data item on the source shard has the first data item's primary key;

determining that a second data item on the destination shard has the first data item's primary key; and setting a tombstone attribute value of the second data item to true.

11. The computer-implemented method of claim 1, further comprising:

while the one or more data items are being moved from the source shards to the destination shards, the client performing a get type of operation in the second manner relative to a primary key at least in part by:

determining, based at least in part on a quantity of shards in the multi-shard system preceding the change in the quantity of shards, a source shard on which a data item having the primary key is stored prior to the change in the quantity of shards;

determining, based at least in part on a quantity of shards in the multi-shard system following the-change in the quantity of shards, a destination shard on which a data item having the primary key is to be located after the change in the quantity of shards;

determining that a first data item on the destination shard has the primary key and a false tombstone attribute value; and reading attribute values of the first data item.

12. The computer-implemented method of claim 1, further comprising:

while the one or more data items are being moved from the source shards to the destination shards, the client performing a get type of operation in the second manner relative to a primary key at least in part by:

determining, based at least in part on a quantity of shards in the multi-shard system preceding the change in the quantity of shards, a source shard on which a data item having the primary key is stored prior to the change in the quantity of shards;

determining, based at least in part on a quantity of shards in the multi-shard system following the change in the quantity of shards, a destination shard on which a data item having the primary key is to be located after the change in the quantity of shards;

determining that no data item on the destination shard has the primary key;

determining that a first data item on the source shard has the primary key and a false tombstone attribute value; and reading attribute values of the first data item.

13. The computer-implemented method of claim 1, further comprising:

while the one or more data items are being moved from the source shards to the destination shards, the client performing a get type of operation in the second manner relative to a primary key at least in part by:

determining, based at least in part on a quantity of shards in the multi-shard system preceding the change in the quantity of shards, a source shard on which a data item having the primary key is stored prior to the change in the quantity of shards;

determining, based at least in part on a quantity of shards in the multi-shard system following the change in the quantity of shards, a destination shard on which a data item having the primary key is to be located after the change in the quantity of shards;

determining, at a first moment in time, that no data item on the destination shard has the primary key;

determining that no data item on the source shard has the primary key;

determining, at a second moment in time, that a first data item on the destination shard has the primary key and a false tombstone attribute value; and reading attribute values of the first data item.

14. The computer-implemented method of claim 1, wherein moving the one or more data items from the source shards to the destination shards comprises:

incrementing a system-wide version number; and for each first data item having a version number that is less than the system-wide version number, determining, based at least in part on a quantity of shards in the multi-shard system following the shard quantity change, a first destination shard on which the first data item is to be located after the change in the quantity of shards;

for each second data item that (a) has a version number that is less than the system-wide version number and (b) is located on a source shard that differs from a second destination shard on which the second data item is to be located after the change in the quantity of shards, inserting, into the second destination shard, a copy of the second item having the system-wide version number;

for each third data item that (a) has a version number that is less than the system-wide version number and (b) is already located on a third destination shard on which the third data item is to be located after the change in the quantity of shards, changing a version number of the third item to the system-wide version number.

15. The computer-implemented method of claim 1, wherein moving the one or more data items from the source shards to the destination shards comprises incrementing a system-wide version number, and further comprising:

determining a set of queries that are pending against one or more shards in the multi-shard system as of a time that the movement of the one or more data items completes;

waiting for all queries in the set of queries to finish;

after all queries in the set of queries have finished, removing, from all shards in the multi-shard system, all data item copies having version number attribute values that differ from the system-wide version number; and after all queries in the set of queries have finished, removing, from all shards in the multi-shard system, all data item copies having true tombstone attribute values.

16. The computer-implemented method of claim 1, further comprising:

while the one or more data items are being moved from the source shards to the destination shards, and for each particular shard in the multi-shard system, populating a preliminary result queue for that particular shard with data items that both (a) are located on that particular shard and (b) satisfy specified query criteria;

for each particular shard's preliminary result queue, sorting data items in that shard's preliminary result queue based at least in part on primary keys of the data item in that shard's preliminary result queue;

until a preliminary result queue of a shard that is non-empty does not exit, repeatedly performing operations comprising:

selecting a first data item from a set comprising data items currently located at tops of preliminary result queues of all of the shards in the multi-shard system, wherein selecting the first data item from the set comprising data items currently located at tops of preliminary result queues of all of the shards in the multi-shard system comprises:

selecting, from the set, a subset of data items having a smallest primary key of primary keys of data items in the set; and selecting, as the first data item, a data item having a largest version number attribute value of version number attribute values of data item in the subset, adding, to a final result set, each first data item that does not have a true tombstone attribute value, and removing, from every shard's preliminary result queue, all data item copies having a primary key that matches a primary key of the first data item; and after every shard's preliminary result queue is empty, returning data items in the final result set as query result.

17. The computer-implemented method of claim 1, further comprising:

while the one or more data items are being moved from the source shards to the destination shards, the client attempting and failing to perform a delete type of operation in the second manner relative to a first data item having a primary key at least in part by:

determining that no data item on the source shard has the first data item's primary key;

determining that no data item on the destination shard has the first data item's primary key; and generating data that indicates that the delete operation failed due to the first data item not existing.

18. A system comprising:

a plurality of database shards that store data items;

a plurality of clients that are configured to transition, in response to a change in a quantity of the plurality of database shards, from a normal state to a rebalancing state, wherein during the normal state, the client performs a type of operation relative to the data items stored in the multi-shard system in a first manner, wherein during the rebalancing state, the client performs the type of operation relative to the data items stored in the multi-shard system in a second manner, wherein the second manner is different than the first manner, wherein during the rebalancing state, the client performs the type of operation without the client acquiring one or more exclusive locks relative to any of the data items, and wherein during the rebalancing state, the type of operation is performed based on:

a first shard in the multi-shard system, the first shard including a data item stored at a first memory location in the first shard before the change in the quantity of the plurality of database shards, wherein the data items is of data items; and a second shard in the multi-shard system, the second shard including the data item stored at a second memory location in the second shard after the change in the quantity of the plurality of database shards; and at least one computing device configured to (a) determine, while the plurality of clients are in the rebalancing state, and for one or more data items of the data items, one or more destination shards that are separate from one or more source shards, wherein the one or more source shards store the one or more data items during the normal state while each client of the plurality of clients is in the normal state, and (b) move the one or more data items from the one or more source shards to the one or more destination shards while each client of the plurality of clients is in the rebalancing state.

19. A non-transitory computer-readable storage memory storing processor-executable instructions comprising:

instructions to cause one or more processors to determine a change in a quantity of shards in a multi-shard system that has a plurality of shards;

instructions to cause one or more processors to transition a client, in response to determining the change in the quantity of shards, from a normal state to a rebalancing state, wherein during the normal state, the client performs a type of operation relative to data items stored in the multi-shard system in a first manner, wherein during the rebalancing state, the client performs the type of operation relative to the data items stored in the multi-shard system in a second manner, wherein during the rebalancing state, the client performs the type of operation without the client acquiring one or more exclusive locks relative to any of the data items, and wherein during the rebalancing state, the type of operation is performed based on:
- a first shard in the multi-shard system, the first shard including a data item stored at a first memory location in the first shard before the change in the quantity of shards, wherein the data is one of the data items; and
- a second shard in the multi-shard system, the second shard including the data item stored at a second memory location in the second shard after the change in the quantity of shards;

instructions to cause one or more processors to determine, while the client is in the rebalancing state, and for one or more data items of the data items, one or more destination shards that are separate from one or more source shards, wherein the one or more source shards store the one or more data items during the normal state prior to transitioning the client from the normal state to the rebalancing state; and instructions to cause one or more processors to-move the one or more data items from the one or more source shards to the one or more destination shards while the client is in the rebalancing state.

20. The computer-implemented method of claim 1, further comprising:
- identifying a first quantity of shards, wherein the first quantity of shards indicates a quantity of shards in the multi-shard system before the change in the quantity of shards;
- identifying a second quantity of shards, wherein the second quantity of shards indicates a quantity of shards in the multi-shard system after the change in the quantity of shards;
- identifying the first shard based on the first quantity of shards, wherein the first shard is included in the plurality of shards; and
- identifying the second shard based on the second quantity of shards, wherein the second shard is included in the plurality of shards.

* * * * *

UNITED STATES PATENT AND TRADEMARK OFFICE
CERTIFICATE OF CORRECTION

PATENT NO. : 9,619,545 B2
APPLICATION NO. : 14/226557
DATED : April 11, 2017
INVENTOR(S) : Hardy et al.

Page 1 of 1

It is certified that error appears in the above-identified patent and that said Letters Patent is hereby corrected as shown below:

On the Title Page

On page 3, Column 2, under Other Publications, Line 66, delete "Trivoli" and insert -- Tivoli --, therefor.

On page 3, Column 2, under Other Publications, Line 72, delete "acrchitecture" and insert -- architecture --, therefor.

In the Specification

In Column 15, Line 17, delete "UNIXO" and insert -- UNIX® --, therefor.

In the Claims

In Column 28, Line 14, in Claim 11, delete "the-change" and insert -- the change --, therefor.

In Column 32, Line 6, in Claim 19, delete "to-move" and insert -- to move --, therefor.

Signed and Sealed this
Tenth Day of April, 2018

Andrei Iancu
*Director of the United States Patent and Trademark Office*